United States Patent
Conforti

(10) Patent No.: US 10,970,694 B2
(45) Date of Patent: *Apr. 6, 2021

(54) SYSTEM FOR INTERACTIVE MARKETING IN RECONFIGURABLE VENDOR SPACE

(71) Applicant: WASHINGTON PRIME GROUP LP., Columbus, OH (US)

(72) Inventor: Louis G. Conforti, Columbus, OH (US)

(73) Assignee: WASHINGTON PRIME GROUP L.P., Columbus, OH (US)

(*) Notice: Subject to any disclaimer, the term of this patent is extended or adjusted under 35 U.S.C. 154(b) by 263 days.

This patent is subject to a terminal disclaimer.

(21) Appl. No.: 15/955,045

(22) Filed: Apr. 17, 2018

(65) Prior Publication Data

US 2018/0232716 A1 Aug. 16, 2018

Related U.S. Application Data

(63) Continuation-in-part of application No. 15/948,590, filed on Apr. 9, 2018, and a continuation-in-part of
(Continued)

(51) Int. Cl.
*G06Q 30/00* (2012.01)
*G06Q 20/20* (2012.01)
(Continued)

(52) U.S. Cl.
CPC ........... *G06Q 20/203* (2013.01); *G06Q 20/18* (2013.01); *G06Q 20/202* (2013.01);
(Continued)

(58) Field of Classification Search
CPC ............ G06Q 20/203; G06Q 30/0639; G06Q 20/202; G06Q 20/18; G06Q 30/0601;
(Continued)

(56) References Cited

U.S. PATENT DOCUMENTS

2006/0149640 A1* 7/2006 Gordon .............. G06Q 30/0625
705/26.2
2008/0301102 A1* 12/2008 Liang ..................... G06Q 30/02
(Continued)

FOREIGN PATENT DOCUMENTS

WO 2008/052270 A1 5/2008

OTHER PUBLICATIONS

Website "http://trueform.io/" No copy provided, per MPEP 609. Copy submitted in parent U.S. Appl. No. 15/709,323.
(Continued)

*Primary Examiner* — Anand Loharikar
(74) *Attorney, Agent, or Firm* — Squire Patton Boggs (US) LLP

(57) ABSTRACT

A system of the present invention includes a shared commercial region for use by a plurality of tenant vendors, providing both a virtual and tangible experience regarding products of the tenant vendors. The system can also include a common area of the shared commercial region, populated by interaction terminals and goods linked to product information pages available through the interaction terminals or mobile devices. Through various embodiments, tenant vendors may be efficiently represented within a shared commercial region in high-cost/rent locations and geographically diverse venues, and in locations not normally suited for a small vendor to establish a sales presence. Also provided are systems for completing purchases on an immediate or deferred basis, and systems to monitor and analyze customer traffic and behaviors.

17 Claims, 10 Drawing Sheets

Related U.S. Application Data application No. 15/923,483, filed on Mar. 16, 2018, and a continuation-in-part of application No. 15/923,704, filed on Mar. 16, 2018, said application No. 15/923,483 is a continuation-in-part of application No. 15/709,323, filed on Sep. 19, 2017, now Pat. No. 10,540,702.

(60) Provisional application No. 62/421,960, filed on Nov. 14, 2016, provisional application No. 62/417,139, filed on Nov. 3, 2016.

(51) Int. Cl.
*G06Q 20/32* (2012.01)
*G06Q 30/06* (2012.01)
*G07F 11/00* (2006.01)
*G06Q 20/18* (2012.01)
*G07F 9/00* (2006.01)

(52) U.S. Cl.
CPC ..... *G06Q 20/3274* (2013.01); *G06Q 30/0601* (2013.01); *G06Q 30/0605* (2013.01); *G06Q 30/0635* (2013.01); *G06Q 30/0639* (2013.01); *G06Q 30/0643* (2013.01); *G07F 9/002* (2020.05); *G07F 11/007* (2013.01)

(58) Field of Classification Search
CPC ........... G06Q 30/0643; G06Q 30/0635; G06Q 30/0605; G06Q 20/3274; G07F 11/007; G07F 9/002
USPC .............................................. 705/26.1–27.2
See application file for complete search history.

(56) References Cited

U.S. PATENT DOCUMENTS

| | | | |
|---|---|---|---|
| 2010/0100236 A1* | 4/2010 | Segal | G07F 9/02 700/232 |
| 2015/0025936 A1* | 1/2015 | Garel | G06Q 30/0269 705/7.29 |
| 2015/0317619 A1 | 11/2015 | Curtis | |

OTHER PUBLICATIONS

Howland, Daphne, Mall operator gives online retailers a spot with "In Real Life" shop, dated Aug. 8, 2017, www.retaildive.com/news/mall-operator-gives-online-retailers-a-spot-with-in-real-life-shop/448856/. No copy provided, per MPEP 609. Copy submitted in parent U.S. Appl. No. 15/709,323.

Zumbach, Lauren, Water Tower Place concept shop will bring online brands together "IRL", dated Aug. 8, 2017, www.chicagotribune.com/business/ct-water-tower-place-irl-concept-shop-0809-biz-20170808-story.html. No copy povided, per MPEP 609. Copy submitted in parent U.S. Appl. No. 15/709,323.

Manoff, Jill, GGP looks to revive its malls with interactive concept stores, dated Aug. 7, 2017, www.glossy.co/store-of-the-future/ggp-looks-to-revive-its-malls-with-interactive-concept-stores. No copy provided, per MPEP 609. Copy submitted in parent U.S. Appl. No. 15/709,323.

Unruh, Julie, Online shopping comes to life at Water Tower with store called "In Real Life", dated Aug. 29, 2017, wgntv-com.cdn.ampproject.org/c/wgntv.com/2017/08/29/online-shopping-comes-to-life-at-water-tower-with-store-called-in-real-life/amp/. No copy provided, per MPEP 609. Copy submitted in parent U.S. Appl. No. 15/709,323.

May 16, 2019 International Preliminary Report on Patentability issued in International Patent Application No. PCT/US2017/059729.

\* cited by examiner

SYSTEM FOR INTERACTIVE MARKETING IN RECONFIGURABLE VENDOR SPACE

CROSS REFERENCE TO RELATED APPLICATIONS

This application is a continuation in-part of U.S. Non-Provisional patent application Ser. No. 15/948,590 (the '590 application) filed Apr. 9, 2018. This application is also a continuation in-part of U.S. Non-Provisional patent application Ser. No. 15/923,704 (the '704 application) filed Mar. 16, 2018. This application is also a continuation in-part of U.S. Non-Provisional patent application Ser. No. 15/923,483 (the '483 application) filed Mar. 16, 2018. This application is also a continuation in-part of U.S. Non-Provisional patent application Ser. No. 15/709,323 (the '323 application) filed Sep. 19, 2017, which is a non-provisional patent application of U.S. Provisional patent application Ser. No. 62/417,139 (the '139 application) filed Nov. 3, 2016, and U.S. Provisional Patent Application No. 62/421,960 (the '960 application) filed Nov. 14, 2016. This application also claims the benefit and priority of the '139 application and the '960 application. The entirety of each of the '323 application, the '139 application, the '960 application, the '483 application, the '704, and the '590 application is herein fully incorporated by reference.

BACKGROUND

Field

There is provided a system providing a shared commercial region for one or more tenant vendors to engage prospective customers in commerce. For example, certain shopping center (or retail venues) or similar shopping centers may benefit from a system for interactive marketing in a reconfigurable vendor space, where vendors may present both a virtual and physical presence, including presentation of goods for inspection by prospective customers that are linked to online product information served by vendors and managed by a host.

Description of the Related Art

Shopping centers are popular venues for merchandisers to sell their goods and services. For a number of reasons, including an attractive mix of shopping center tenants, the better shopping centers tend to have something for everyone, and as a result, such shopping centers tend to have significant customer volume. High customer volume is desirable on a regular and consistent basis not only from the perspective of the shopping center owner but also from the perspective of the shopping center tenants.

Such a situation creates high demand for tenant spaces in the better shopping centers, the result of which is competition for such spaces. Further, the initial costs for lease and buildout of sales floor areas can be a substantial barrier to entry for smaller and newer vendors, yet a more engaging experience is needed than a simple walk-up cart used by many such vendors in a shopping center environment. Consequently, there are many vendors that would like to have tenant space in the better shopping centers, but simply cannot afford to do so given the competitive environment for such attractive shopping center spaces.

SUMMARY

As set forth in more detail below, in various embodiments there is provided, a system that includes a shared commercial region for one or more tenant vendors to engage consumers in commerce. The shared commercial region, and indeed, a larger system for providing a reconfigurable retail presence are provided by an entity (also known herein as a "host") that operates the shared commercial regions, and provides the necessary infrastructure and support to allow a plurality of tenant vendors to obtain a marketing presence within the shared commercial regions. In a preferred embodiment, there is provided within the shared commercial region a housing including features that may provide for a multisensory merchandising experience. The system includes a common shared interior space area of the shared commercial region, and optionally, the offerings being provided by the tenant vendors are curated by a person who may provide guidance and assistance to customers who wish to know more about the products and/or services of the tenant vendors. The shared interior space can be configured to permit pedestrian travel to and among one or more customer interaction terminals, and to approach and interact with product samples for goods associated with tenant vendors who have established a presence within the shared commercial region. Each of the interaction terminals is capable of accessing any of the tenant vendors' information, and for guiding the customer to interact with the provided product samples. As used herein, collectively, products, goods and/or services can be referred to simply as "goods."

In one embodiment, there is provided a system, comprising: a communication gateway within a shared commercial region, the gateway communicatively coupled to a local network and at least one host server, the host server providing an interface for presenting information relating to one or more tenant vendors of the shared commercial region; a plurality of interaction terminals communicatively coupled to the communication gateway through the local network, each of the plurality of terminals configured to allow interaction with one or more websites hosted by at least one of the tenant vendors of the shared commercial region; and a common area of the shared commercial region. In such embodiments, the common area is configured to permit pedestrian travel among the plurality of interaction terminals, and the common area is configured to present one or more physical representations of goods offered by a vendor tenant. In certain embodiments, each of the interaction terminals is configured to present product information from a selected tenant vendor, and to prompt a customer to interact with the one or more physical representations of goods corresponding to the selected tenant vendor's product information. In this manner, customers entering the shared commercial region can freely roam between products and interaction terminals, and can quickly gain information about a particular product.

Interaction terminals may comprise any device suitable for customer browsing, more particularly, for browsing the products of the tenant vendors that are represented by the shared commercial region (and those tenant vendors who have a relationship with the hosting company, even if they do not have a presence within the shared commercial region). In one embodiment, interaction terminals further include: a user interface comprising a display, a speaker, and user input device, the user input device comprising one or more of a touch screen, a mouse, a camera, a touch tablet, one or more buttons, a microphone, and NFC component (e.g., a near-field communication device as defined in, for example, ISO 15693, ISO/IEC 18092, or ISO/IEC 14443, the contents all of which are incorporated by reference herein for all purposes), an RFID component (e.g., a radio-frequency identification device as defined in one or more of ISO/IEC 15693, ISO/IEC 18000, ISO/IEC 18092, the contents all of which are incorporated by reference herein for all purposes), and a keyboard, and a processor coupled to the user interface, a device communication interface coupled to the local network, and a memory. Further, the memory of the interaction terminal is configured to store instructions that when executed by the processor, perform the functions of: receiving, through the device communication interface, product information provided by one or more of the tenant vendors; displaying, through the user interface, the product information corresponding to goods offered by the selected tenant vendor; prompting the customer to select a product offered by the selected tenant vendor; determining, from an indicia provided by the host server, that a physical representation of the goods offered by the selected tenant vendor are available for inspection by the customer in the shared commercial region; and providing instructions regarding location of the goods offered by the selected tenant vendor in the shared commercial region. The interaction terminals may provide guided prompts to customers, and in an embodiment, the memory is configured to store instructions that when executed by the processor, perform the functions of: prompting the customer to enter a product identifier corresponding to goods located within the shared commercial space; and displaying, through the user interface, product information corresponding to goods offered by the selected tenant vendor. The interaction terminals also encourage customers to engage in the tangible multisensory experience that an online-only shopping experience cannot provide; for example, in one embodiment, the interaction terminals are configured to prompt the customer to engage in a multisensory experience including one of: a tactile experience of the goods; an olfactory experience of the goods; an audio experience of the goods; a video experience of the goods; and a taste experience of the goods.

The shared commercial space is equipped with a networking capability to, among other things, provide data and connectivity between the components in the shared commercial space and to outside web services through an external network. In one embodiment, the local network comprises a wired network comprising one of Ethernet network or an IEEE 802.3 network. The local network may also contain a wireless network interface coupled to the communications gateway, wherein the wireless network is configured with one or more of an ISO 14443 protocol, an ISO 18000-6 protocol, a Bluetooth protocol, a Zigbee protocol, a Wibree protocol, a Wi-Fi protocol, an IEEE 802.15 protocol, an IEEE 802.11 protocol, an IEEE 802.16 protocol, an ultra-wideband (UWB) protocol; and an IrDA protocol (in regards to the aforementioned standards, all documents are fully incorporated by reference herein for all purposes). In various embodiments, a combination of wired and wireless approaches are utilized to provide data connectivity to all components of the shared commercial region, and protocols other than those explicitly listed may be utilized to provide the desired network performance. A system embodiment also provides that the communications gateway comprises one or more of a router or a switch communicatively connected to an external network and the local network.

The communication gateway provides connectivity to external networks (including, but not limited to the Internet), and provides an interface to external servers and websites. In one embodiment, one or more tenant vendor servers are communicatively coupled to the communications gateway through the external network, and the product information corresponding to goods offered by the selected tenant vendor are provided to the interaction terminals though the communications gateway. In this way, tenant vendors may update their product information and provide it, on demand, to customers who are browsing their products in the shared commercial region. In one embodiment, one or more tenant vendor servers are communicatively coupled to at least one of the plurality of interaction terminals, and the one or more tenant vendor servers present the product information corresponding to goods offered by the selected tenant vendor to the interaction terminals. Alternatively, the one or more tenant vendor servers may be communicatively coupled to the host server, the one or more tenant vendor servers present the product information corresponding to goods offered by the selected tenant vendor to the host server, and the host server presents, through the local network, the product information to one of the plurality of interaction terminals.

Goods (and as mentioned above, information regarding services) provided by tenant vendors may be provided on display within (or nearby) the shared commercial region. In one embodiment, an interior space of the shared commercial region comprises a display fixture configured to display one or more goods corresponding to a tenant vendor. In various embodiments, the display fixture is configured to exhibit goods through one or more of: a shelf unit; a movable rack; a locking cabinet with transparent door; a deployable shelf configured to be lowered from a ceiling of the shared commercial region; a deployable shelf configured to be raised from a floor of the shared commercial region; a deployable drawer configured to slide from an enclosed cabinet; a motor-driven rotatable column display; and combinations thereof.

To assist customers with identifying which goods correspond to product information being provided in an interaction terminal, embodiments of the present invention provide a variety of visual indicia and prompts to relate the goods on display in the shared commercial region (e.g., the sample goods) to product information being presented in the interaction terminals. In one embodiment, a visual indicia is provided in proximity to goods displayed on the display fixture, the indicia comprising one of: a descriptive text label, identifying a name of the goods and a product number corresponding to a product number for the associated tenant vendor; a scanable RFID tag containing a unique identifier for the displayed goods; an NFC tag containing a unique identifier for the displayed goods; a QR code (e.g., a "Quick Response" barcode, one version of which is set forth in ISO/IEC 18004, the contents of which are fully incorporated by reference herein for all purposes) encoded with a website link corresponding to a product information page for the goods provided by the associated tenant vendor; a controllable lighting element coupled to a lighting controller, the lighting controller coupled to the local network, wherein the lighting element is illuminated by the lighting controller when a corresponding product information page is selected on an interaction terminal by a customer; a button coupled to the local network, wherein upon a customer actuating the button a corresponding product information page is displayed on one of the interaction terminals. The visual indicia may also include a colored highlight being displayed on the display terminal in proximity to the product being displayed and a colored light being illuminated in proximity to the goods on display.

The host, or entity that operates the shared commercial region, may operate a remote host server (such as one operated in a cloud-based environment) that provides data to each shared commercial region, tracks the products on display in the shared commercial regions, and provides the main hosting page that presents all tenant vendors who have engaged the host to market their goods, among other functions. In one embodiment, the host server further comprises a processor, a memory communicatively coupled to the processor, a database communicatively coupled to the processor, and a communication interface coupled to the processor and to the communication gateway of the shared commercial region through an external network; and wherein: the database of the host server is configured to store: an inventory of goods corresponding to a selected tenant vendor; a location where the goods may be found within a particular shared commercial region; and a linking identifier uniquely associating the goods with respective product information from the respective corresponding tenant vendors.

As will be discussed below, the host may operate a plurality of shared commercial regions, and each may be located in proximity to one another, or geographically distributed over any desired distance. For example, the host may operate different shared commercial regions in different shopping centers around the world, each of which may have some, all, or none of the tenant vendors of the other shared commercial spaces. Tenant vendors may choose to be present within a particular location of a shared commercial region, and may reconfigure their product offerings, and locations desired for presence within a shared commercial region. Further, product information for tenant vendors may be available from the host's own website regardless of location. Accordingly, in one embodiment, a system further comprises a second shared commercial region, communicatively coupled to the host server through a second communications gateway, and wherein: the host server maintains, in host server database, a geographically-oriented list of goods available by the tenant vendors in a particular shared commercial region; and upon being queried about availability of goods, provides an indicia of where such goods may be available for inspection by a customer.

An embodiment of the present invention also includes a local server communicatively coupled to the communication gateway, the local server comprising a processor, a memory coupled to the processor, a database coupled to the processor, and a communication interface coupled to the processor. The local server may be utilized for any desired purpose, such as operating local displays, tracking customer traffic, and other functions. An additional embodiment of a system of the present invention includes a media player coupled to the local network and to an external display, wherein the media player is further configured to display content stored within the media player on the display for viewing by customers; and wherein the display is viewable by customers located outside of but in proximity to the shared commercial region. In an embodiment, the content is transferred to the media player through the network interface, and wherein the content is provided by one of: the host server through the communications gateway; and a local server coupled to the media player through the local network.

Interaction terminals located in the shared commercial region are not the only way customers may interact; in one embodiment, the external areas of the shared commercial region are equipped with interactive displays, such as touch displays, that allow customers to walk up to the outside of the shared commercial region and interact without needing to go inside. In one example, the system provides an external interaction display comprising: a user interface comprising: an externally-oriented display, a speaker, and user input device, the user input device comprising one or more of a touch screen in proximity to the externally-oriented display, a mouse, a camera, a touch tablet, one or more buttons, a microphone, and NFC component, an RFID component, and a keyboard; and a processor coupled to the user interface, a device communication interface coupled to the local network, and a memory; wherein the memory stores instructions that when executed by the processor of the external interaction display performs the functions of: displaying product information content to a customer located outside of the shared commercial region; prompting the customer located outside of the facility to engage in the user interface to view the product information content; and prompting the customer located outside of the facility that goods corresponding to the product information content are available in one of: a location inside of the shared commercial region; a fixture located outside of the shared commercial region; or are available for purchase through a vending apparatus coupled to the processor.

The interaction terminals, in various embodiments, may also be used to initiate purchases, or to defer purchases to a different time by sending information allowing the customer to easily complete a transaction away from the shared commercial region at any desired time. One embodiment provides for accepting input by a customer through one of the interaction terminals comprising a request to purchase the goods; and directing the customer to a tenant vendor's website order processing webpage hosted by a tenant vendor server coupled to the shared commercial region through an external network; whereupon the customer may complete a transaction to purchase the goods through the tenant vendor's website. Yet another embodiment provides for accepting input by a customer through one of the interaction terminals comprising a request to purchase the goods; and prompting the customer to enter one of an email address or a phone number corresponding to the customer's mobile device; and sending a deferred purchase link to one of the customer's email address or mobile phone.

Embodiments of the present invention also provide assistance with order fulfillment. In one embodiment, a vending machine is configured to provide gift cards corresponding to a plurality of the respective tenant vendors, and this vending machine may be located inside the shared commercial region, installed in an exterior wall of the shared commercial region, located nearby the shared commercial region, or situated at a remote location. Customers may also be provided options for order fulfillment. For example, an embodiment provides a message to the customer indicating the goods are available for receipt at one of: a local locker area; a vending machine in proximity to the shared commercial region; a merchant, the merchant's identifying information and address provided to the customer; and a mail order delivery option.

In various embodiments, customers may complete point of sale transactions directly with the interaction terminals. One embodiment allows the customer to complete a point of sale transaction at the interaction terminal by providing one of: credit card identifying information; a mobile device payment token; information corresponding to the customer's account at an online payment service; an RFID payment token; an NFC payment token; or combinations thereof.

A variety of sensors may be employed in the shared commercial region, for security but also for tracking customer traffic and access patterns in and near the shared commercial region. One embodiment provides, as an aspect of the present system, one or more sensors comprising at least one of a digital camera and a microphone, the one or more sensors communicatively coupled to a local server for monitoring prospective customer traffic, and wherein the local server is configured to track and monitor at least one of: interaction time spent by customers interacting with the goods; dwell time of customers while browsing the goods; initial customer interaction with the shared commercial space, particularly in regard to whether the customer initially visited an interaction terminal or goods; customer transition patterns between particular goods and the display terminal; goods that were frequently interacted with by customers; goods that were infrequently interacted with by customers; goods that were featured for particular customer interest; time of day that a particular type of goods were interacted with by customers; characteristics of customers interacting with displayed goods; and traffic analysis in proximity to external displays to determine likelihood of passers-by being interested in goods on display in the shared commercial region.

Mobile devices, especially those of customers visiting the shared commercial region, may be used in place of interaction terminals or in a manner complementary to the operation of the interaction terminals. Accordingly, an embodiment provides, an interface through the local network to a mobile device, the mobile device configured with an app providing functionality to allow the customer to view product information for goods being marketed in the shared commercial area, and request purchase of the goods through the mobile device. The app may be provided through usual application sales stores for popular mobile devices, and local signage in the shared commercial region may encourage customers to download and install the app to enhance their browsing and shopping experience in the shared commercial regions. Further, after installing the app and granting any necessary permissions, customers could be subsequently contacted to complete pending purchases or to inform the customers of future sales or new vendors coming to the shared commercial regions. The shared commercial regions can be located in any desired area, such as in one of: a store area of a retail venue or shopping center; an open area within a communal walking area of a shopping center; within a large retail store; or within a portable and deployable vehicle.

Beneficial effects of the embodiments of the present invention are numerous, and may include providing a market presence to vendors who would not have the desire or capability (financially or otherwise) to set up a sales operation in an environment such as a shopping center, or in geographically diverse locations. Further systems of the present invention utilize a unique architecture that improves upon previous implementations to allow a scalable architecture to market multiple vendors and tie online content for each of such vendors to physical products at designated locations. Further, the accompanying drawings, which are incorporated in and constitute a part of this specification, illustrate several embodiments of the invention and together with the description, serve to explain the principles of the invention.

BRIEF DESCRIPTION OF THE DRAWINGS

For proper understanding of the invention, reference should be made to the accompanying drawings, wherein.

DETAILED DESCRIPTION

There are provided systems and methods to provide a configurable presence in a shopping space (such as a shopping center) for vendors who normally are not present within such venues. Embodiments of the present invention provide alternative methods for vendors to access consumers at a physical location, and optionally have such consumers engage interactively with the vendors' products in a location that does not require the expensive refurbishing of a rented store location nor the attendant costs to lease such spaces. Thus, certain embodiments of the present invention relate to a system for interactive marketing in a reconfigurable vendor space. The system can be variously embodied, with the following providing some illustrative examples.

The system can include a plurality of tenant presences in a shared commercial region; the presences are virtual, presented through interactive terminals, as well as physical, through sample goods and merchandise available for customer interaction. The commercial region can be located in a store area of a shopping center or any other area. For example, a defined area of a shopping center, such as an area usually occupied by a single store, may serve as the commercial region. This area can be referred to as a storefront. Another option is to use a kiosk or cluster of kiosks in an open area of a shopping center or other shopping center. In certain embodiments, the kiosk installation may be a temporary structure that can be assembled and disassembled to be installed at another location. Additional illustrative embodiments are discussed below.

Figure 1:
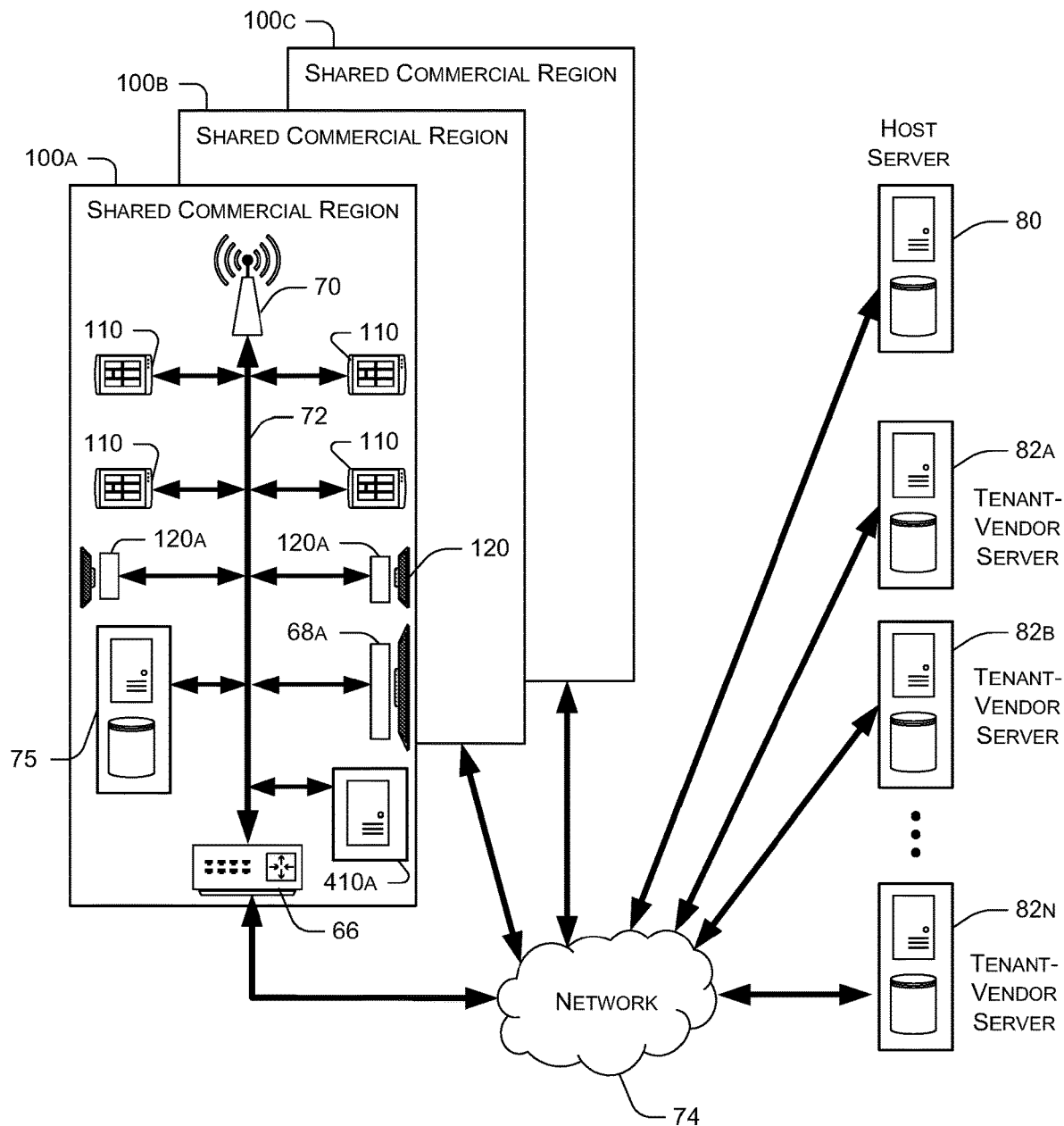
FIG. 1 illustrates a block diagram showing an overview of aspects of the present invention.

FIG. 1 illustrates a system overview of the present invention and block diagram form, particularly showing electronically interfaced components. Shared commercial region 100A is but one of a possible plurality of shared commercial regions 100A, 100B, 100C, that may be co-located or geographically removed from one another. Each shared commercial region 100A, 100B, 100C, may comprise a shared commercial region such as those illustrated in FIGS. 2 through 7B (see, e.g., reference numeral 100). Each shared commercial region 100A includes a communication gateway 66, which, in some embodiments, may include one of a switch or a router. In alternative embodiments, the communications gateway 66 may comprise a direct connection to a remote server or network without a switch or router within the shared commercial region 100A. The communication gateway is coupled to a local network 72, which may be implemented in a number of wired or wireless protocols, for example a wired Ethernet implementation, or a wireless Wi-Fi implementation. The shared commercial region includes a plurality of interaction terminals 110, each of which may operate individually to provide product information to customers who have entered the shared commercial region. The interactive terminals 110 may comprise any type of computing device with a convenient user interface, such as a touch screen or a computer tablet that is interfaced through the local network 72 to the communication gateway 66. In one embodiment, a wireless network interface 70, such as a wireless hotspot, provides wireless conductivity to devices within range of the shared commercial region, and Wi-Fi is a preferred embodiment. Both devices within the shared commercial region 100A, and mobile devices brought by customers to the shared commercial region may interface with the wireless local network 72. In another embodiment, interactive terminals 110 may be connected to network 74 through a wireless communications protocol, such as by a cellular connection provided by a wireless transceiver within the interactive terminals 110 communicatively coupled to a mobile service operator, who, in turn, provides connectivity to network 74. Also provided in the shared commercial region 100A, are externally-facing displays 120 that may be viewed by customers from outside the shared commercial region 100A. Interfaced to the displays 120, are also media players 120A that provide content for display. Displays 120 may also be oriented in a manner so that customers inside the shared commercial region may be able to view the content as well as customers located outside of the shared commercial region. Content for the media players 120A is relayed through local network 72, from either the local server 75, or externally from the host server 80 via the network 74 to the communication gateway 66. Also provided in the shared commercial region 100A is a lighting interface 410A, that optionally provides prompted guidance to indicate specific goods on fixture units that may correspond to products being viewed by a consumer on interaction terminals 110. Shared commercial regions 100B and 100C may comprise a similar configuration of components to those illustrated in regard to shared commercial region 100A, but are illustrated without such components for clarity of viewing. The host server 80 is a remotely implemented server, such as a cloud-based server, that maintains the configuration of goods and marketed products in each respective shared commercial region. The remote host server 80 also provides the top-level entry point for customers as illustrated in the master landing page 54 in FIG. 8. This unified interface allows a consumer to browse multiple vendors from a single web interface, proceed to one tenant vendor's product offerings, interact with goods that such tenant vendor may have provided for interaction in the shared commercial region, and once the customer has viewed the relevant product information, the customer may initiate a transaction to purchase the item at the present time or may request a link for execution of the purchase at a future date as described more completely in regard to FIG. 10. Also shown in FIG. 1 are tenant vendor servers 82A, 82B and 82N (corresponding to any desired number of tenant vendor servers). In one embodiment, the tenant vendor servers provide, through the network 74, the product information that is viewed by customers on the interaction terminals 110. Thus, tenant vendors are free to modify and customize the content of their websites as product updates occur, and as product reviews are updated. The tenant vendors may also work with the host of the shared commercial regions to modify an inventory of goods exhibited for inspection by customers when visiting particular shared commercial region facilities. The host server 80 may act as a coordination facility to manage the inventory of goods being demonstrated in each respective shared commercial region, and manage the provision of data from tenant vendor websites to the shared commercial regions.

Figure 2:
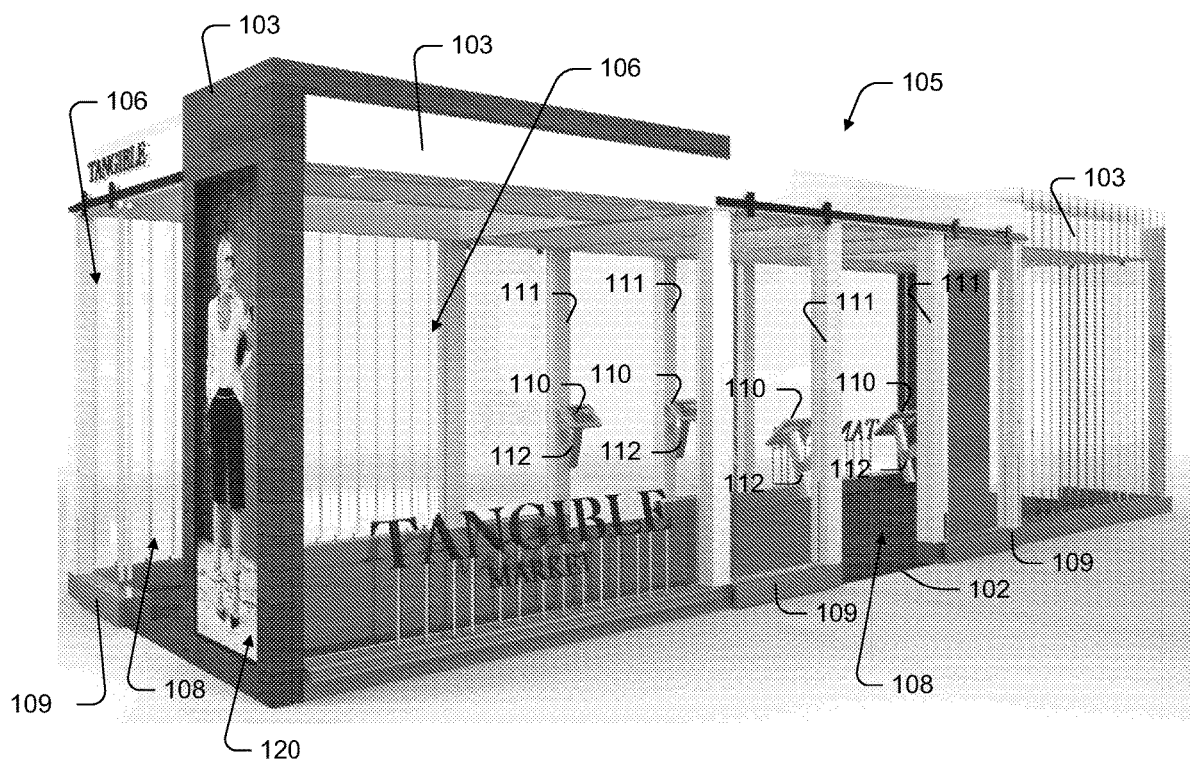
FIG. 2 illustrates a partial external perspective view of a housing embodiment of the present invention.
Figure 3:
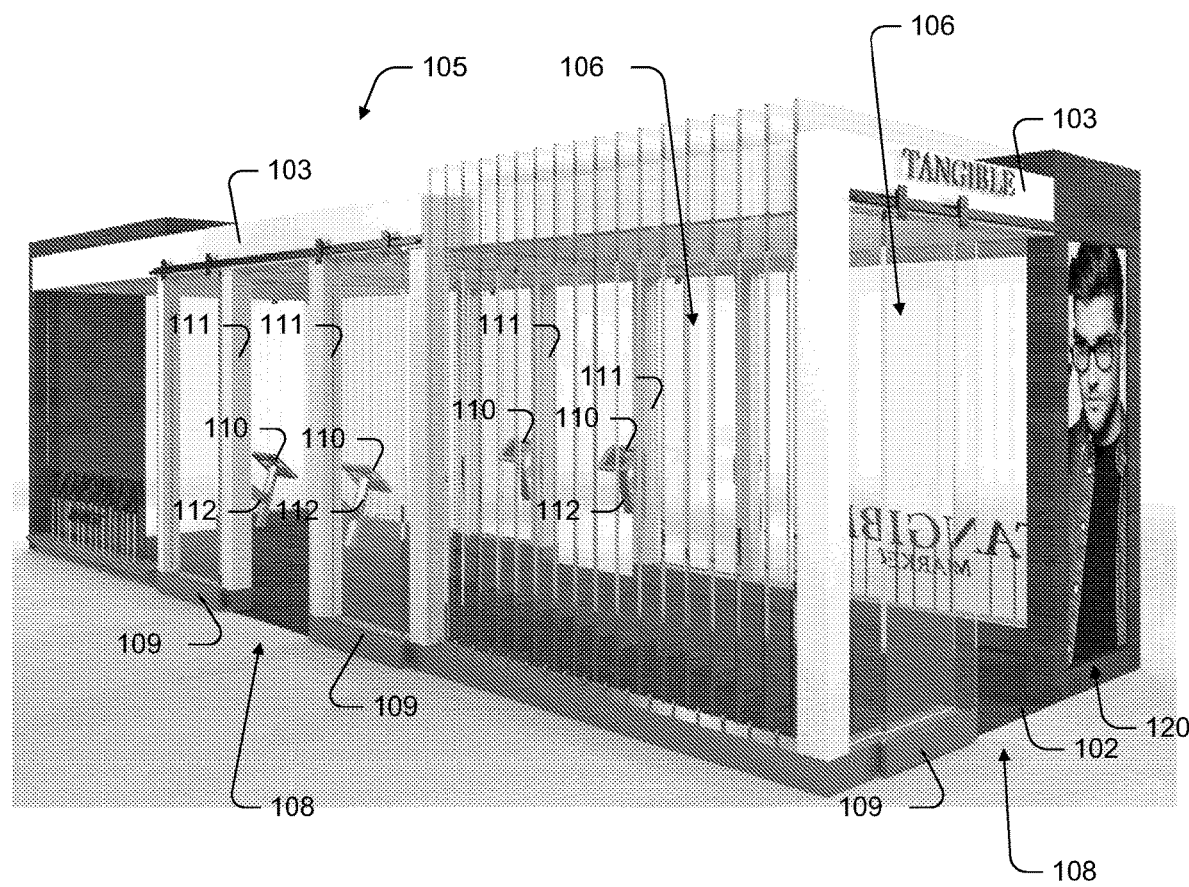
FIG. 3 illustrates a reverse partial external perspective view of the housing as shown in FIG. 2.
Figure 4:
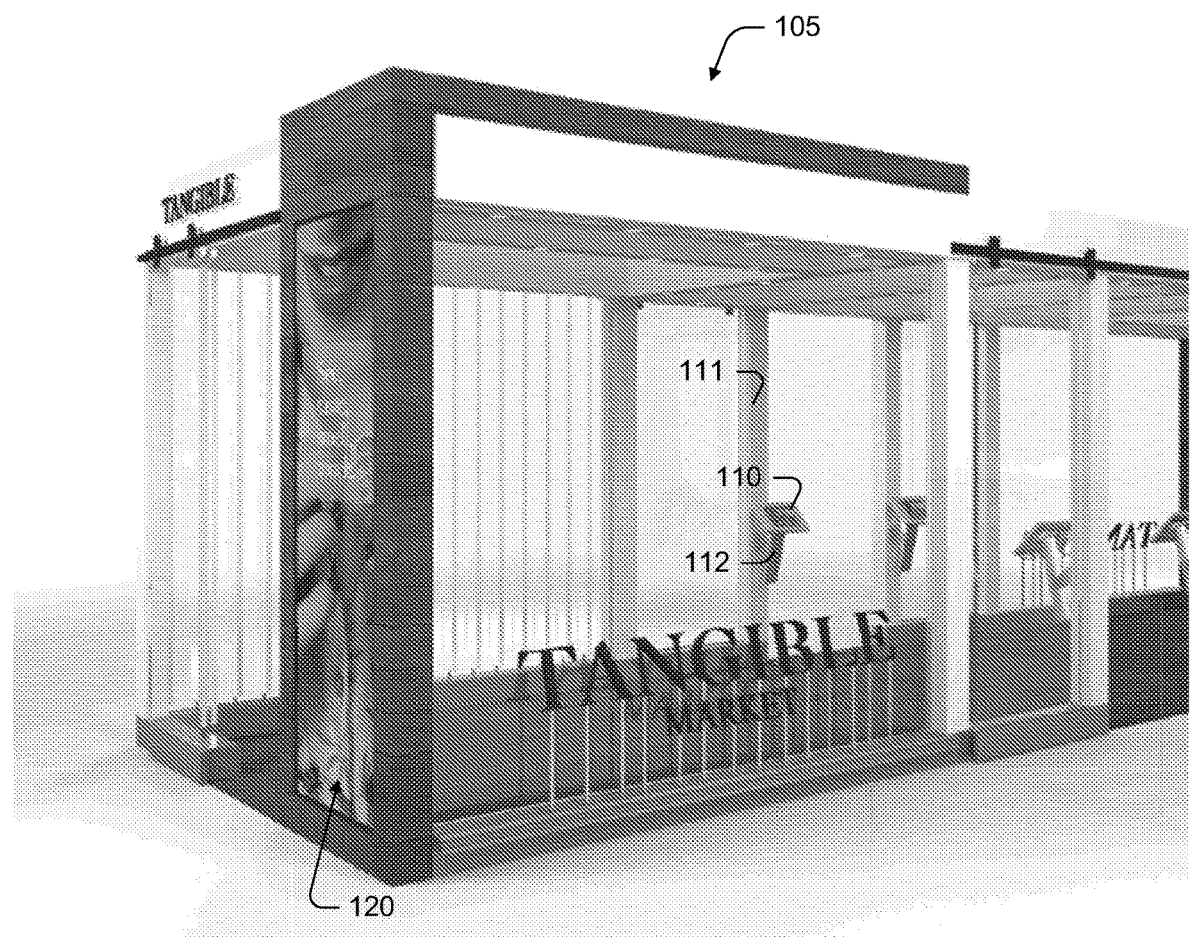
FIG. 4 illustrates another alternative partial external view of the housing as shown in FIG. 2.
Figure 5:
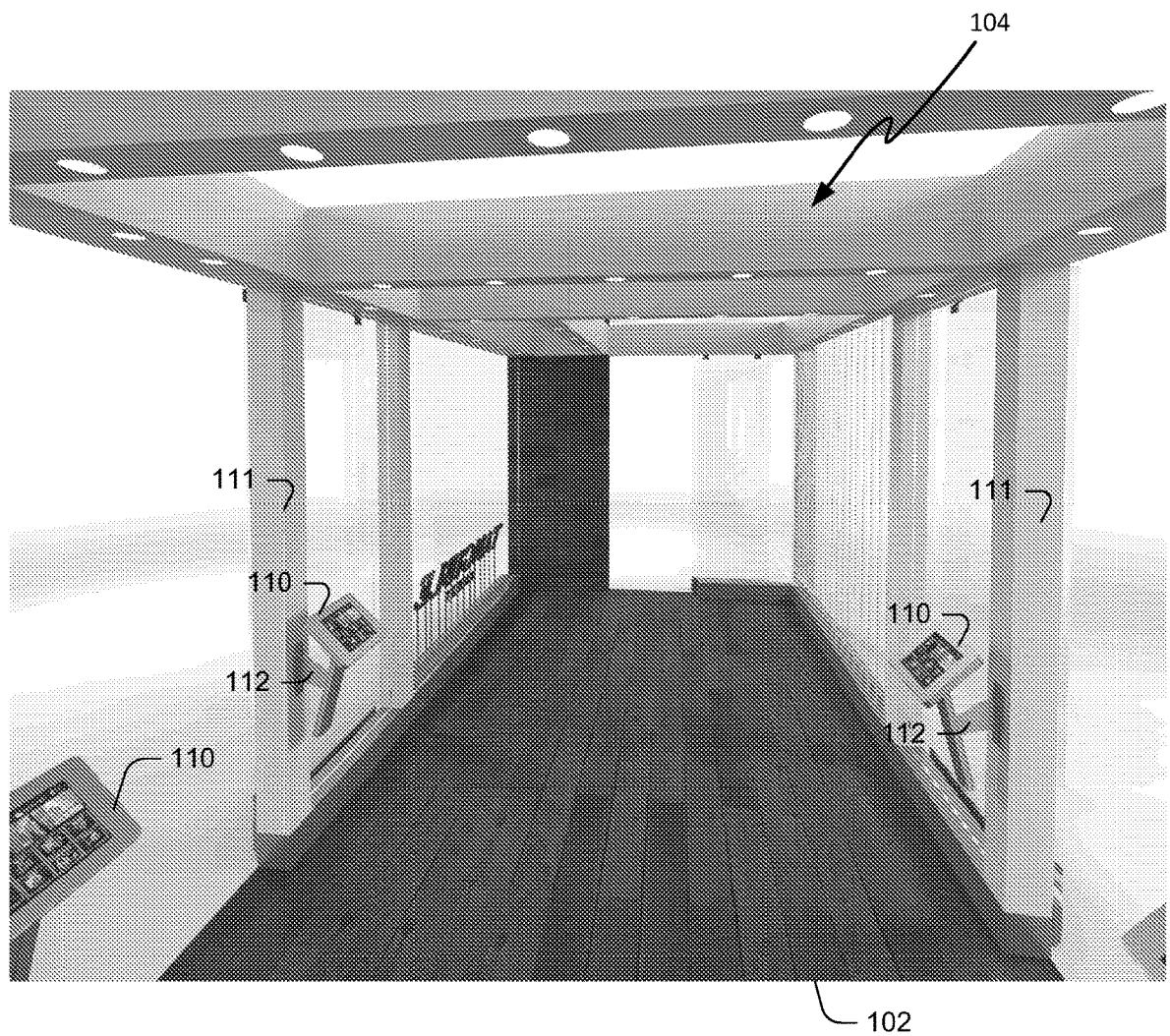
FIG. 5 illustrates a partial internal view of the housing illustrated in FIG. 2, showing a shared internal space (with fixtures removed for clarity).

FIG. 2 illustrates one embodiment of the present invention in the form of a housing 105 implemented in a shared commercial region 100. Alternate partial exterior views of the housing 105 are shown in FIGS. 3-4, and a partial interior view of the housing 105, showing the shared interior space 104, is provided in FIGS. 5 and 6. One exemplary view of an interior space 104 of the shared commercial region with various fixtures installed may be seen in FIG. 6. The shared interior space 104 as shown in FIG. 5 is generally defined by the interior space of the housing 105 of the shared commercial region 100 shown in FIGS. 2-4. The housing 105 may include one or more external display panels 120 that may comprise a video screen or backlit static screen to advertise sample content of tenant vendors operating within the shared interior space 104. The display panels 120 may provide video content in addition to audio content to capture the attention of passers-by, and in one embodiment, may have a touch screen input capability to interact with consumers who desire more information before entering. The housing 105 may include a plurality of interaction terminals 110 attached to columns 111 through fixtures 112. The interaction terminals 110 provide a customer interface in which one or more vendors may show their goods and/or services to prospective customers. Interactive displays may include a processor, a memory communicatively coupled to the processor, a user interface communicatively coupled to the processor and including one or more of a display, a touch screen, a keyboard, a mouse, a touch pad, a camera, a microphone, a printer, an NFC terminal such as a device configured to interact with NFC-compatible devices, and wired and wireless communications capabilities. The displays 110 may similarly provide the customers with opportunities to peruse the product or service offerings of a tenant vendor and directly (or through a deferred approach) purchase such goods from the tenant vendor. In one embodiment, interaction terminals 110 comprise a touch-sensitive display, and in a further embodiment, may include an Apple® iPad, Android-based tablet, Microsoft® Surface tablet, or other interactive computing tablet or device. The housing 105 provides for interaction between a customer and physical product samples made available by the tenant vendor for touching, hearing, tasting, feeling, smelling or otherwise experiencing in person. It is envisioned in various embodiments that only a sampling of products are made available for physical interaction by customers, but a tenant vendor may offer many products for review virtually through interaction terminals 110. The interaction terminals 110 as shown in FIGS. 2-6 are attached to columns 111 through fixtures 112. Fixtures 112 and columns 111 provide physical support and customer-accessible presentation of the display devices 110, and provide internal connections for routing of cabling for data provisioning, such as through an Ethernet cable or other networking cable, and power provided to the displays 110. Such cables may be routed upwards through an inner cavity (not shown) of columns 111 through inner cavity (not shown) of horizontal beams 103 or under floor 102 for connection to regulated power supplies, utilities, communication gateways, routers, bridges, an intermediate distribution frame, a main distribution frame, or servers for provisioning of data. In addition to or in replacement for wired data connections to the interaction terminals 110, wireless connections may be provided from a server in the form of wireless protocols such as Wi-Fi or Bluetooth, or other device networking protocols such as Wibree or ZigBee. Through such wired or wireless data provisioning connections, tenant vendors may provide service of product offerings, customer interface, and purchase completion (or purchase deferment, as is explained further below). The housing 110 further includes a plurality of entryways 108 for customer ingress and egress, and in the illustrated embodiment, the entryways 108 further comprise closable and lockable doors 109 (shown as slidably-closable barn-style doors). In a preferred embodiment, the housing comprises four walls enclosing a shared interior space 104, the walls comprising any desired combination of solid construction, opaque construction, translucent construction or transparent glass 106, which is further illustrated in FIG. 5.

The shared interior space 104 can include one or more fixtures displaying product samples provided by tenant vendors in a manner inviting customers to physically engage with such products. In one embodiment, when a customer is viewing a particular item from the interaction terminal 110, which the vendor has provided for engagement within the shared interior space 104, the interaction terminal 110 provides encouragement (and optionally, directional location information) for the customer to engage physically with the on-site product sample. In a further embodiment, a light illuminates a product that is being shown on an interaction terminal 110, and thus, the customer may be guided to the product to determine which product is currently being displayed on the display terminal. In yet another embodiment, a colored light or other indicia is illuminated by the product, and a corresponding color highlight is rendered around the corresponding product on the interaction terminal 110 to reinforce the link between the on-line product and the on-premises product sample. In another alternate embodiment, touch sensors including buttons, pressure sensitive pads, pressure switches, or the like are located in proximity to product samples on the fixtures, and customer interaction triggers a display terminal to automatically present the tenant-vendor's product for perusal (thus customers may initiate interaction with any tenant vendor through first interacting with a product and then being guided to an interaction terminal 110). Further embodiments include movable racks configured to display a plurality of different goods of the respective tenant vendors. For example, a movable rack may be a rack such as is used in dry cleaning establishments, whereby clothing can be conveyed from a storage area to a display area. Alternatively, the rack may be a conveyor belt, such as used in a kaiten sushi restaurant, whereby the goods are paraded past the potential customers, and the customers can easily remove the goods from the belt. Other movable racks are also permitted. For example, movable racks may slide down from the ceiling or may rise up from the floor. The movable racks may thus be configured to permit multiple tenant vendors to share the same tenant space such ash shared interior space 104. In yet another embodiment, when a customer selects a product from an interaction terminal 110 for perusal, the movable rack retrieves the product sample from a storage area (not shown) and moves the product within proximity of the customer, and solicits the customer to interact with the product. The shared interior space 104 may include mechanically movable front elements of a kiosk to allow changing product or vendor, based on any criterion, like time of day, anticipated customer base, or via user request. Rotatable displays can change the products being demonstrated, or even the vendors being presented. Likewise, product samples may be rotated in inventory as well for any desired purpose, such as presenting new products, sale products, or products optimized for time day (e.g., to accommodate demographics of customers typically browsing at that particular time of day). Further embodiments include automated automatons (e.g. robotically-controlled fixtures) to move product samples from storage locations to within proximity of customers.

The interaction terminals 110 can include an electronic display configured to illustrate to a customer a plurality of different goods of the respective tenant vendor. For example, a single tangible example of a garment may be provided on-premises within the shared interior space 104, but the electronic display may provide illustration of other available sizes, colors, lengths, or materials. Alternatively, a single item from a line of items may be tangibly presented on-premises, and the electronic display may illustrate related items in the line of items.

The electronic display of the interaction terminals 110 may be remotely reconfigurable. For example, tenant vendors may be permitted to update, refresh, or otherwise modify the electronic display of the interaction terminals 110 from a local server or remote web server such as tenant vendor servers (FIG. 1, 82A-82N). Thus, if some new products become available, the electronic display can be updated accordingly. Similarly, if the tenant vendors decide to highlight a particular product, that product can be given prominence on the electronic display of an interaction terminal 110, and control of the ultimate layout of brands and vendors may be controlled by a remote host server (FIG. 1, 80). The electronic display of interaction terminal 110 can also be used for providing a sales pitch or marketing material, such as video or text advertisements of goods being offered by a tenant vendor. The electronic display of the interaction terminals 110 may interface to a website, which may be operated by an owner of the system, as distinct from the tenant vendors. The owner's website may then re-route shoppers to the tenant vendors' respective websites.

The shared interior space 104 can be configured to provide a multisensory experience including a tactile experience of the goods. Thus, for example, the sensory experience can include visual, tactile, audio, olfactory, and taste opportunities, depending on the particular goods being presented by a particular tenant vendor. For example, if food is being presented, samples of the food may be supplied. In this case, the shared interior space 104 may be equipped with a dispenser for dispensing the samples of foodstuffs, candies, snacks, and the like, preferably in hygienic disposable packages that are designed to be safely stored and automatically dispensed by a mechanical apparatus. Samples of other kinds of goods may also be provided. For example, samples of fabric, paper, bedding, clothing, draperies, wallpaper, gloves, and other flexible objects may be presented for tactile interface by the customer. The product samples may be usable and replenishable. For example, a maintenance worker or robot may be able to restock the dispenser or counter with product samples, when it is detected that a current available stock of samples is low or out.

Figure 6:
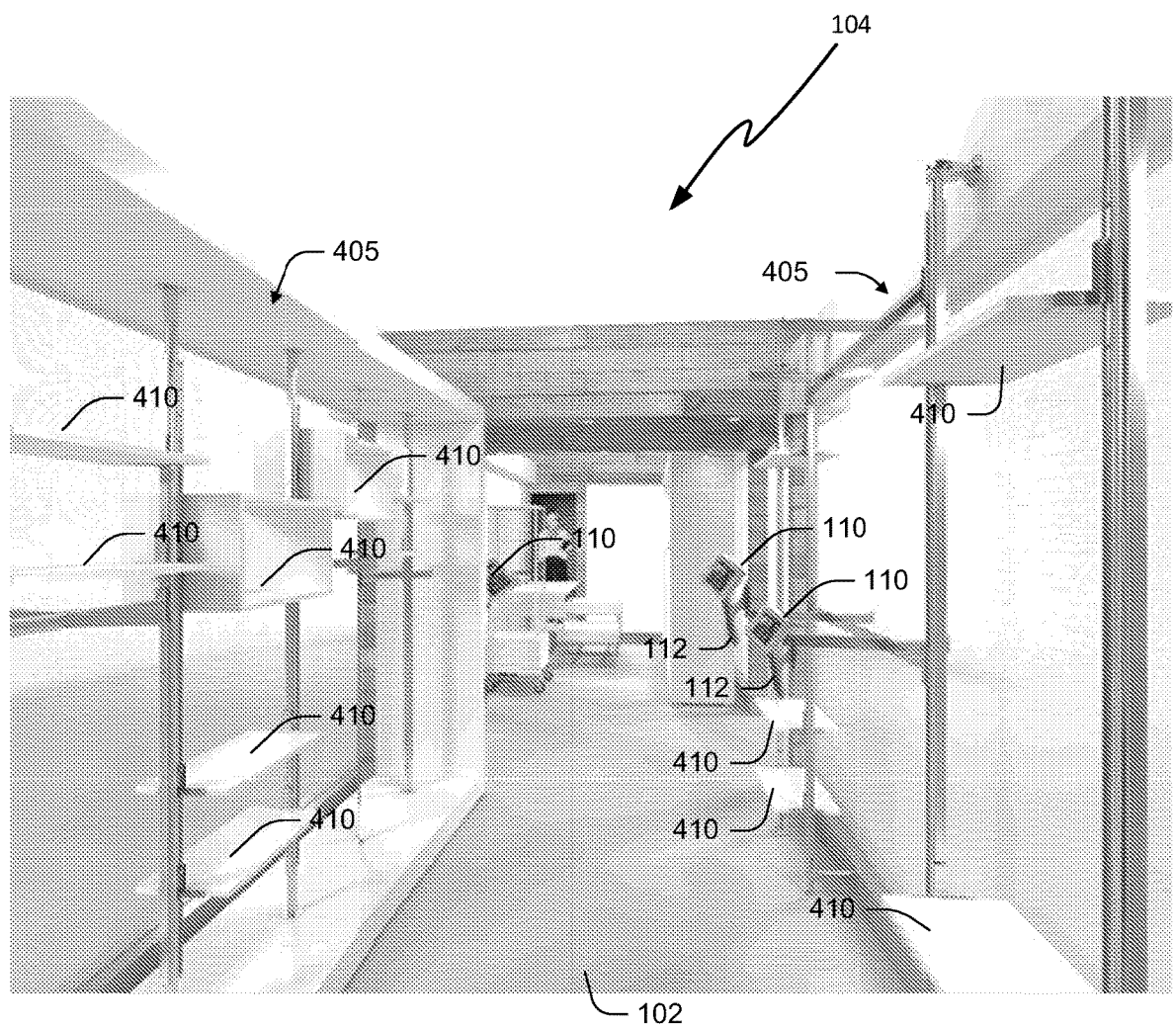
FIG. 6 illustrates a partial internal view of the housing illustrated in FIG. 2, showing fixtures that may be used to display goods nearby the interaction terminals.

FIG. 6 illustrates a partial interior view of shared interior space 104, within a shared commercial region 100. Interaction terminals 110 may be placed in any convenient location within the shared interior space 104, and preferably in proximity to display fixtures 405. In one embodiment, a person employed by the host of the shared commercial region 100 (known in various embodiments as an "Artemis") possesses a mobile (or, alternatively, fixed) variant of an interaction terminal 110, and may move within or outside of the shared commercial region 100 to interact with potential customers. In one aspect of the present invention, customers may require interaction with the Artemis before being granted access to use interaction terminals 110, and the Artemis may grant access through any appropriate method, including entry of an access code by the customer, or remote authorization of a desired interaction terminal 110 that the customer intends to use as initiated from the Artemis' own interaction terminal. Display fixtures 405 may comprise any desired housing, shelving, or display mechanism to properly market goods provided by vendors for customer inspection. While shelves 410 are illustrated in FIG. 6, any type of fixture may be placed within the shared interior space 104, including but not limited to a shelf unit; a movable rack; a locking cabinet with transparent door; a deployable shelf configured to be lowered from a ceiling of the shared commercial region; a deployable shelf configured to be raised from a floor of the shared commercial region; a deployable drawer configured to slide from an enclosed cabinet; a motor-driven rotatable column display; and combinations thereof. Thus, the illustration of FIG. 6 is merely exemplary, and many other configurations may be possible.

Figure 7A:
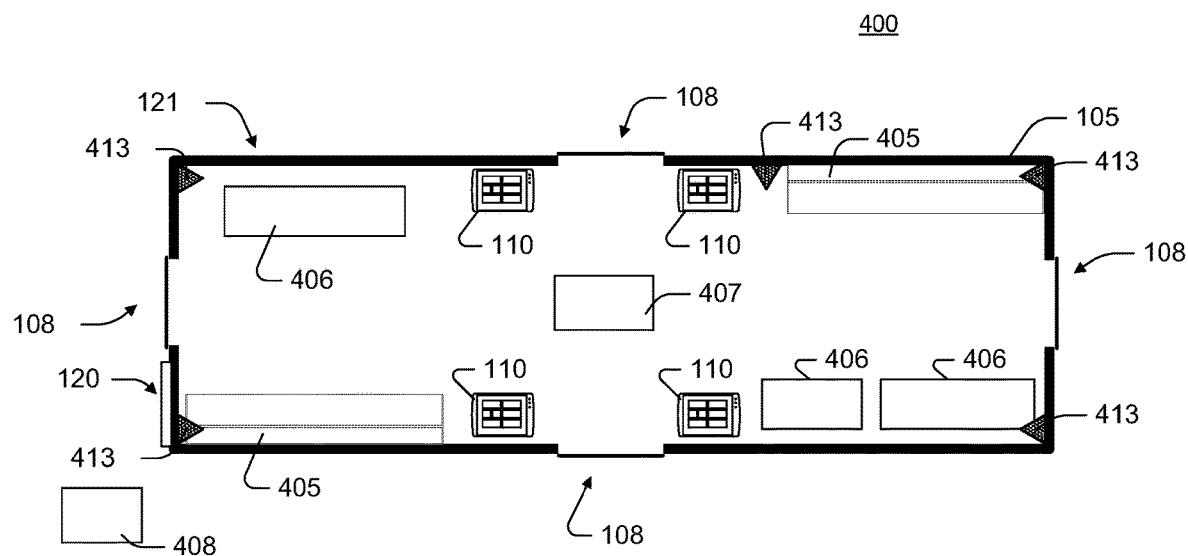
FIG. 7A shows a plan view of one possible internal arrangement of a shared commercial region.
Figure 7B:
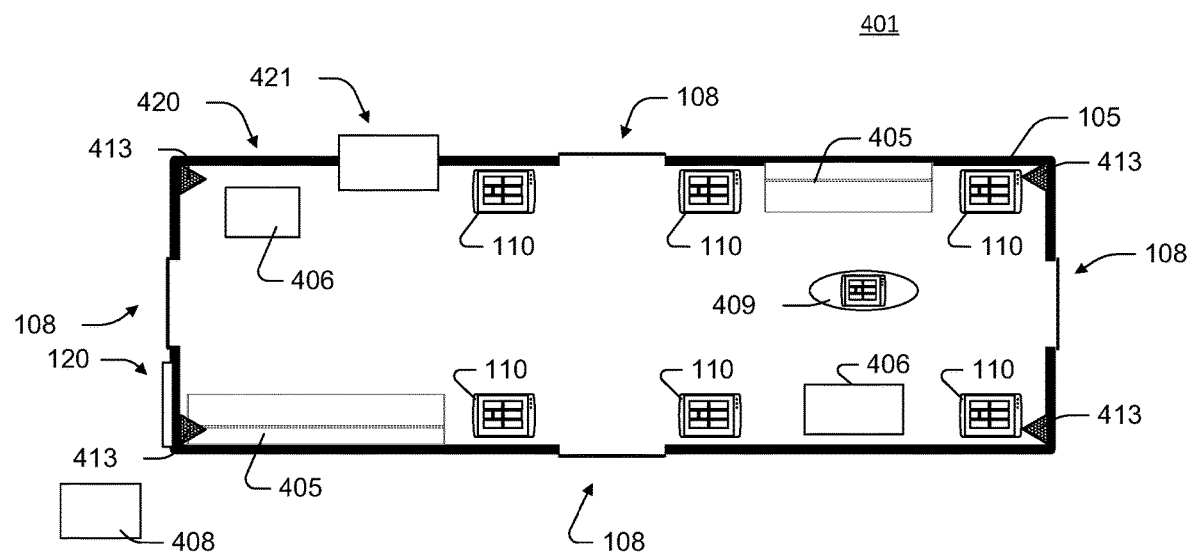
FIG. 7B shows another plan view of a possible internal arrangement of a shared commercial region.

FIG. 7A illustrates a plan view of potential layouts of fixtures 405, 406, 407, and interaction terminals 110 within the shared commercial region 400. Interaction terminals 110 may be conveniently placed in any location conducive to customers desiring access to information, and preferably in proximity to fixtures containing goods for inspection. A variety of fixture types may be used in a single configuration, such as the detached fixtures 406, the attached shelving 405, centrally located table 407, and optional external sample table 408. Sensors 413 may also be located in the shared commercial region 400 such as in the corners, and in central locations such as shown in the top central part of the illustration, depending on the type of data to be gathered by the sensors. If the sensors 413 are cameras, for instance, proper line of sight coverage may require high placement in multiple locations, but audio sensors may be placed at lower but more frequent installation locations in the shared commercial region 400. FIG. 7B illustrates yet another possible layout of a shared commercial region 401 with six interaction terminals 110, shelving fixtures 405, attached walls of the shared commercial region 400, detached fixtures 406 placed in opposite corners of the shared commercial region 400, and a table with a built-in interaction terminal 409 located centrally in the shared internal space. Alternate installations may also be implemented, such as vending machine 421, which is configured to dispense products which may be ordered by external touchscreen 420, and such dispensed products may represent samples or goods for sale. FIGS. 7A and 7B are but two examples of many possible configurations of placements of internal structures for the shared commercial regions.

Figure 8:
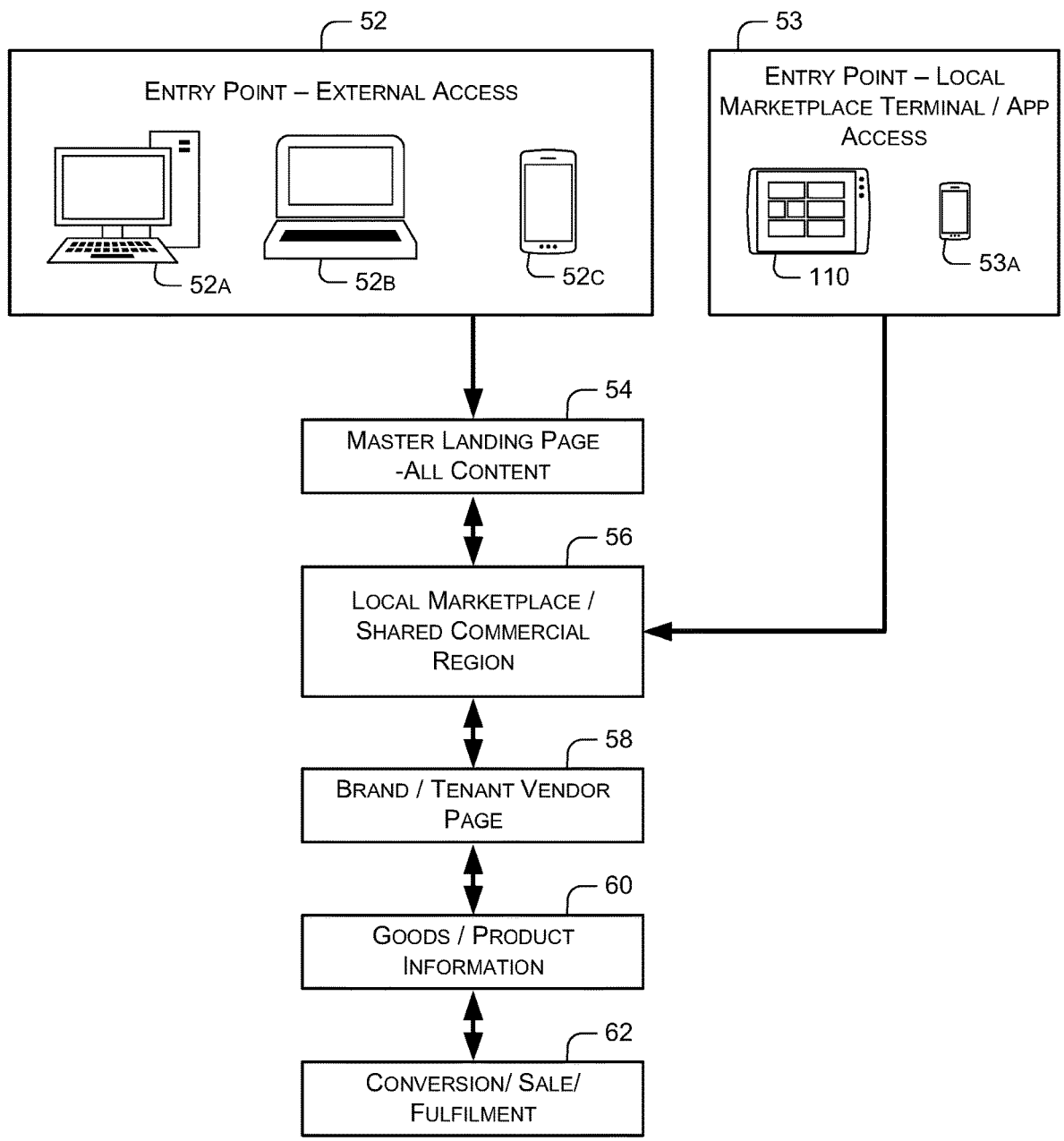
FIG. 8 shows an entry point flow diagram for various use scenarios of systems of the present invention.

FIG. 8 illustrates one implementation of a process flow 11 for the present invention, with multiple entry points depending upon customer journey. Beginning with entry point 53, a customer may enter a local shared commercial region, and use an interaction terminal 110 displaying, in one variant, a responsive web-page-based user interface, or in another variant a mobile device 53A with an installed app. Either variant may be utilized by a customer to obtain product information about products on display in the shared commercial region. In one embodiment, an interface on the interaction terminal 110 displays a list of brands showcased at that local shared commercial region, and allows the customer to select 58 a brand and its associated products for viewing. Once in the brand page 58, an individual product can be selected 60 to obtain more information, and the customer may interact with the goods corresponding to such products that may be on display in the shared commercial region. If the customer decides to purchase a product 62, various options may be presented as discussed in regard to FIGS. 9 and 10, including point-of-sale transaction, mobile device payment, or deferred ordering as discussed in regard to FIG. 10. As an alternative entry point in FIG. 8, a customer may utilize an external access method 52, such as viewing the host's website through computer 52A, 52B, or through a mobile device 52C. In this instance, the user lands 54 at the master landing page operated by the host. In the master landing page, all content is available to the user for all shared commercial regions operated by the host, and for all tenant vendors for whom the host provides marketing services. As before, the user may progress from the master landing page 54 to any particular shared commercial region, and view products available in a local marketplace 56. Likewise, the customer can view a brand or particular tenant vendor page 58, push down into reviewing individual goods or products 60, and purchase 62 and arrange for delivery of the products. The user may back out of any level 54 through 62 as desired.

Figure 9:
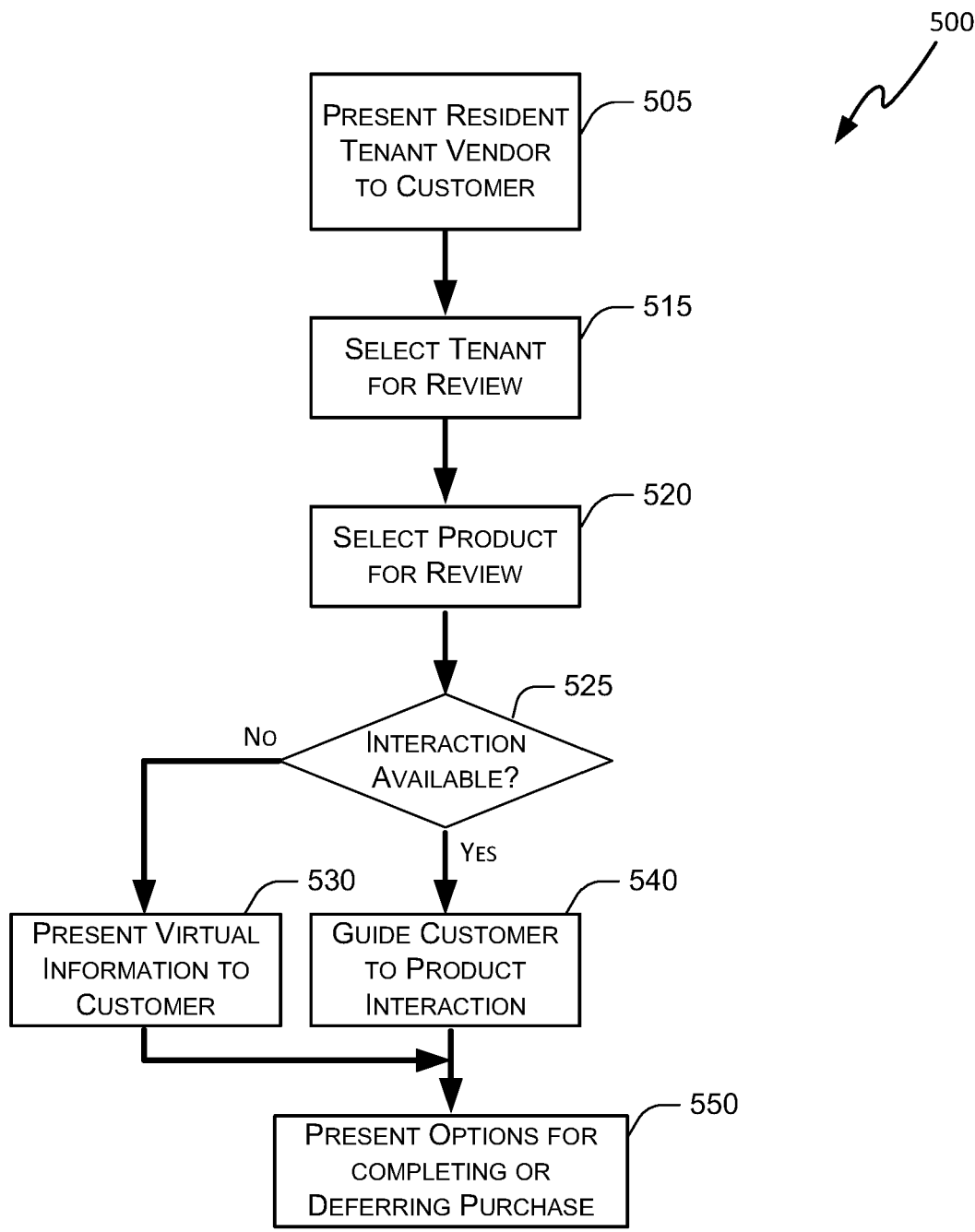
FIG. 9 illustrates a flow diagram for a process of the present invention.
Figure 10:
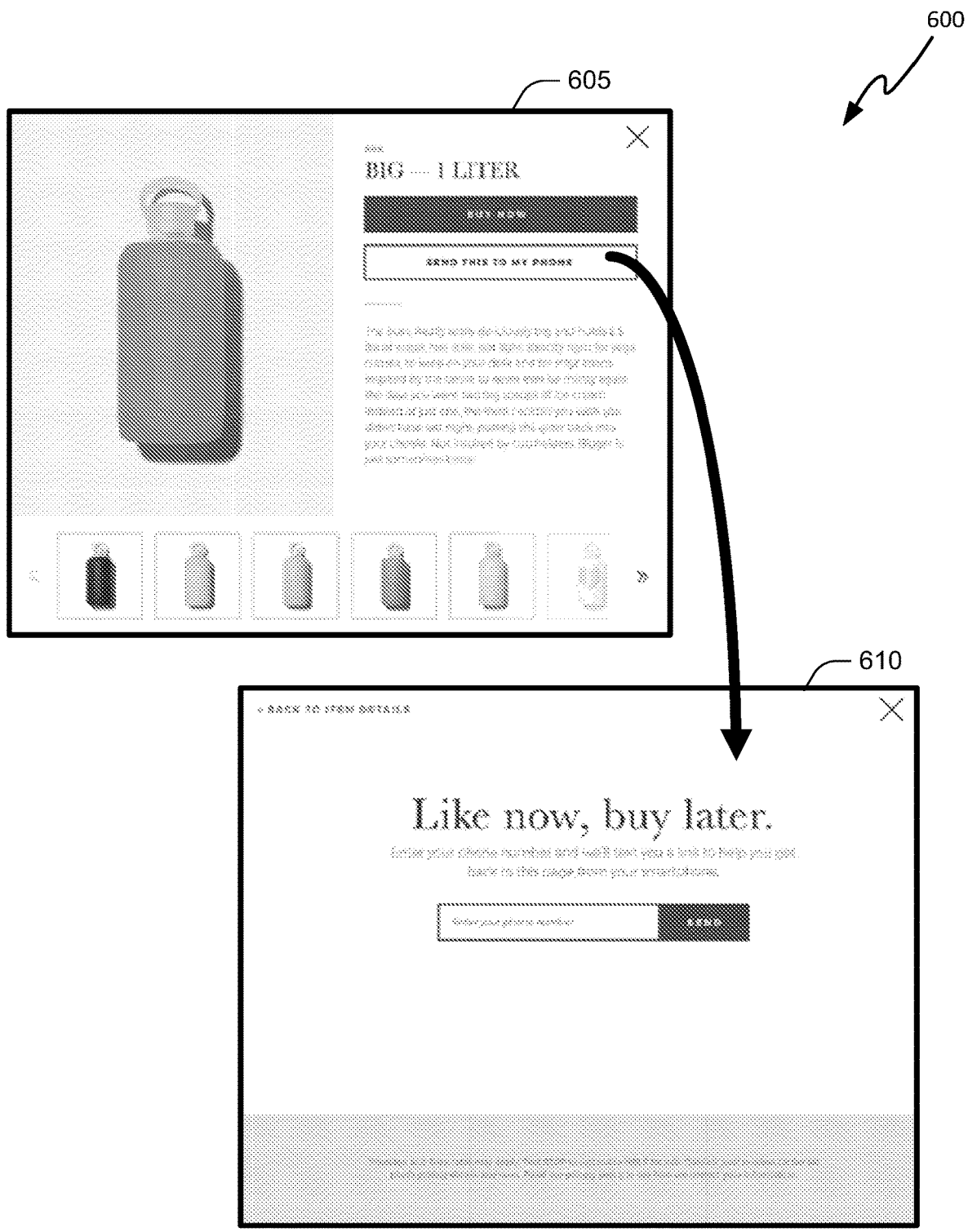
FIG. 10 illustrates example windows for a deferred purchase option presented to a customer on an interaction terminal.

FIG. 9 illustrates one exemplary flow diagram 500 depicting a method of the present invention. At step 505, one or more resident tenant vendors are presented to a customer. Such presentation may entail, for example, a display on interaction terminal 110, summarizing the one or more tenant vendor's offerings in the shared commercial region 100. The customer then selects 515 a tenant vendor for review, whereupon products, goods and/or services offered by the tenant vendor are presented to the customer; in one variant, the presented goods and/or services offered by the tenant vendor are on display in a shared commercial region where the customer is located, but in another variant, when a customer selects a particular tenant vendor for browsing offered products and/or services, those products and/or services may be on display in a different shared commercial region, or, alternatively, not on display at all. In one embodiment, the owner of the shared commercial region 100 presents the resident tenant vendors in step 505, and the particular selected tenant vendor presents content to the customer for steps 520-550. On the interaction terminal 110, the customer is presented 520 one or more of the selected tenant vendor's products for perusal. It is determined 525 by criteria stored in advance by the selected tenant vendor whether a sample product corresponding to the item being viewed on the interaction terminal 110 by the customer may be available on-premises for interaction with the customer. Such interaction may include, for example, viewing the product sample in person, touching/feeling it, smelling it, listening to it, or otherwise physically interacting with the sample product in the applicable manner. If the product sample is present on-premises, the customer is prompted 540 through, for example, the interaction terminal 110, with instructions on where in the shared commercial region the on-premises product sample may be found. If no physical product sample is available on-premises, virtual information about the product may be presented 530 on one or more interaction terminals 110, and in one embodiment, in a multi-screen configuration spanning multiple interaction terminals 110, speakers associated with the display terminals 110, and in one optional embodiment, the panel displays 120. Alternatively, the customer can be given the option of receiving a product sample via home delivery at a later date, or in another embodiment, requesting that a sample product be available at the shared commercial region 100 at a future date for in-person inspection. Whether a sample is present on-premises or not, the customer may be presented 550 with options to purchase the product being presented. Such options may include, for example, ordering the product online directly through the tenant vendor, completing the purchase transaction through a local purchase portal or checkout counter associated with the shared commercial region, or being provided information such as a web link where the customer may defer the purchase to a later time or in a more private venue (such as thorough the customer's mobile phone). FIG. 10 depicts such an option, where in screen 605, the customer is being presented options to "BUY NOW" a large water bottle or to "SEND THIS TO MY PHONE". If the customer clicks the "SEND THIS TO MY PHONE" button, another screen 610 is displayed on the interaction terminal 110, prompting the customer for a mobile phone number where information to complete the purchase may be sent. In one embodiment, a text message may be sent to the user's phone with information such as a URL encoded to the pending transaction stored by the tenant vendor, and in another embodiment, an email message with the relevant pending transaction information.

The electronic display of the interaction terminals 110 may provide information to customers other than presentation of products for sale; for example, the interaction terminals 110 may permit prior order access. For example, interaction terminals 110 may permit a customer to check on the status of an existing order, track shipping for the prior order, to place a new order, or to review an order history.

The system can also include a vending machine configured to provide gift cards corresponding to a plurality of the respective tenants. The gift cards may be ordered directly by customers interacting with the interaction terminals 110, or through a dedicated interface communicatively coupled to the vending machine.

In various embodiments, there is provided a transaction management interface. This interface can permit transaction completion. The interface may be configured to process a transaction with a customer, allow pickup in a common area or permit joint marketing fulfillment. Further, the system can be configured to provide a product to a customer-accessible locker with secure access control, which may be in a common area, in a nearby area, or in a specified proximity to a customer's desired location (for instance near the customer's home or place of business). Alternatively, the system may direct customers to a central facility, which may allow for order fulfillment in a manner faster than delivery to an address.

Referring to FIG. 2, the housing 105 may include exterior displays and/or backlit signs (collectively, 120), providing vendors or others means to display images of interest to the customers. Columns or pillar members 111 of the housing 105 may also include pocket doors to selectively conceal a pullout security curtain, for selective storage or deployment, as needed. Although not shown in FIG. 2, the housing 105 may include wheels, rollers or the like to enable easy movement of the housing to a desired location.

Housings 105 may be utilized anywhere in a shopping center. For example, such housings may be used in common areas of a shopping center. Alternatively, one could utilize a dedicated and branded shopping center store to include a number of such housings within the store, thereby creating a dedicated and branded store to include a number of housings, each of which may offer for interaction with customers the goods of one or more vendors. Again, this approach may enable vendors to have a nontraditional presence in a shopping center, for example without having to enter a traditional lease for a store space within a shopping center. This nontraditional presence may include not only a virtual presence made possible by the interactive displays on the system housing, but also a presence including physical product sample offerings.

As mentioned in part above, purchases made at the housings themselves may be completed by having a customer go to another area of the shopping center for product pick up. For example, there may be a centralized area in which all products could be picked up. Alternatively, lockers could be used to store products, the retrieval of which may be facilitated by providing the customer at time of purchase with a code to open the locker containing the purchased goods. Purchases made may also be delivered by third-party delivery services, such as Amazon®, FedEx®, or the like.

While embodiments of the present invention have been described herein to enable vendors without a traditional shopping center presence the ability to offer their goods within a shopping center, embodiments of the present invention may be used in any other desired circumstances. For example, such housings may be used outside of shopping centers, indeed in any desired location, a shopping center, a strip retail center, a sporting event or any other location in which goods may be offered to a customer. Moreover, while embodiments of the present invention have been described to facilitate establishing a presence into a shopping center environment for vendors that do not typically have a traditional shopping center presence, embodiments of the present invention may similarly be used with vendors who already have a traditional shopping center presence or indeed any other desired person or entity.

Certain embodiments of the invention may relate to a system and method for dynamic marketplace provisioning. Thus, certain embodiments may relate to a product merchandising and delivery system. More particularly, certain embodiments may relate to an architecture for remote provisioning, including servers, client interface, hardware device, wireless and wired network configuration, and connection to a system interface.

There can be remote configuration of the system. For example, the terminals in the system may be remotely configurable by a remote computer system using a remote desktop feature or similar remote management tools. Additionally, display space in the system may similarly be remotely manageable. For example, servo motors or other remotely controllable devices may be used to adjust shelves to different heights, rotate shelves into or out of view, move conveyor belts to different positions, or open drawers or cabinets. Additionally, electronic signage and lights can be remotely controlled. For example, a scrolling (mechanical or electrical) sign can be remotely turned on or off, or speeds of the sign may be altered. An electronic display can be remotely programmed to play various videos, slideshows, images, and/or text. Speakers may be remotely controlled to play various helpful words or sounds. Optionally, the speakers may also be remotely controlled to play entertainment music, or audio accompanying video.

There can be server management. A server maintained by the owner of the system can be managed itself and can be used to manage the system. For example, a Linux-based or other server may be provided in a data center, at the owner's facility, or locally at the system itself. The server can keep track of the system. One server can be used to support multiple installed systems.

The system can be configured to keep feedback of what consumers or other visitors interacted with. For example, the system can be configured to keep feedback of what visitors interacted with electronically, what visitors interacted with in person, or any combination thereof. The in person interactions can include touching, smelling, listening to, looking at, or even tasting, depending on the nature of the product or good being considered.

The system can have an ability to map purchases to alternative providers. For example, a tenant of the system may agree to allow in-center pickup of a product at another company if the other company agrees to revenue share. Alternatively, the tenant of the system may be a re-brand of products from existing shopping center owners to provide an alternate venue for sales. Thus, in certain cases, the alternative provider may opaquely be the tenant or a related company to the tenant. In another case, the tenant may, for example, be a clothing brand. This clothing brand may offer customers the option to pick up purchased clothing from a retailer, such as a department store.

Thus, in certain embodiments, the system may prompt a customer who has considered a good to obtain the good from an alternative provider of the good. This alternative provider may be a competitor with revenue sharing, a retailer or distributor of a brand, or the like. The customer may make a purchase transaction through the system and may receive a voucher that permits the customer to obtain the good at one or more alternative provider, at the option of the customer. The voucher may be provided electronically through email, short message service (SMS), or the like, or may be provided in hard form, such as by being printed out for the customer.

Certain embodiments can model consumer traffic and dynamically change kiosks based on changes to customer base. For example, if older people or stay-at-home parents come in at certain hours, the system can change kiosk presentation to cover the intended audiences. The kiosk can then change to content oriented at younger people later at night or at theater crowds when shows start or end. Similarly, the kiosk can shut down or secure itself at the end of the day, and can re-open or unsecure itself at the beginning of the day.

The system can also, in certain embodiments, can change a kiosk based on an individual consumer or set of consumers. For example, if the system detects that the consumer is female and dressed in business attire, the system may configure the kiosk to display or particularly highlight goods that are expected to appeal to businesswomen. Likewise, if the system detects that a consumer is in a wheelchair, the system can change the kiosk to enhance its accessibility to people who are in wheelchairs, such as adjusting the height of shelves.

A number of sensors can characterize the environment of the common area. The sensors can include video sensors, motion sensors, and/or audio sensors. Other sensors are also permitted, such temperature sensors, barometric pressure sensors, and humidity sensors. The audio sensors may be attached to a processor, the processor be configured to analyze the audio. The analysis of the audio can include analysis of the position of noise sources, such as the noise of people's shoes. The analysis of the audio can also include analysis of voices, including voice recognition. This analysis of audio can be performed alone or in combination with other sensor data, such as in combination with analysis of video.

The system can also include a pattern recognition mechanism that can be configured to identify a pattern among shoppers or potential shoppers. The pattern recognition may be used to, for example, assess the general age of an audience in or near the common area.

The system can also poll consumers using audio, text, or other prompts. For example, the system can use a computer to ask consumers "Did you find what you needed?" Any other questions or requests for feedback can be asked. The computer can be equipped with voice recognition to analyze the answer received.

The system can further ask whether a visitor to the common area consents to being photographed. The system can present a mock-up of the visitor, for example superimposing clothing, jewelry, or other accessories, such as glasses, onto the image of the visitor. The image can be a still image or a moving video, depending on the superimposition technique.

The system can be configured to ask each visitor for contact information, such as a phone number or email address, for further follow-up with the visitor, or to provide the visitor with information regarding the visit.

The system can dynamically reconfigure display interfaces. The system can, for example, have an interface to other sales kiosks in the area. Alternatively, the system can allow a visitor or other user to change the experience and/or storefront to them. Possibly, the vendor or tenant whose display is changed may be compensated for this change through a revenue sharing agreement. After the customer is done with the reconfigured storefront, the storefront can return to its previously scheduled configuration, such as to its previously assigned vendor. This approach may be useful if a particular vendor is overwhelmed with interest and other customer stations are under-utilized.

In certain instances, the system can span or bridge several kiosk stations, networking them together to enhance the experience in a more immersive way. Monetary incentives can be used to convince vendors to tolerate this reconfiguration.

In certain embodiments, each of the tenants of a given kiosk may have no physical store of their own. Thus, certain embodiments may provide a physical location for brands that do not have their own physical stores.

In certain embodiments, the tenants of a given kiosk may change over time. For example, the tenants may change every 90 days. Nevertheless, in certain embodiments the electronic databases associated with the kiosk may also include the products of former tenants. Thus, the terminals of the kiosk may be configured to display products from tenants that no longer have physical products in the kiosk.

In certain embodiments, none of the tenants of the kiosk may have any employees in or around the kiosk. Instead, the kiosk may be unmanned, or may be manned by one or more employee of the owner of the kiosk.

In certain embodiments, an entire catalog of products of each tenant may be provided through the terminals, even though only a limited selection of products are available for physical interaction.

In certain embodiments, the terminal may be configured to direct a visitor to a website or app that can be accessed from the visitor's personal electronic device, such as a smart phone, laptop, or the like.

Certain embodiments may provide a system and method for agile order fulfillment. Agile order fulfillment can include various ways of providing the product to a buyer. For example, orders can be fulfilled in a variety of traditional or non-traditional ways.

Certain embodiments can have either integrated or separate product fulfillment configurations. For example, in an integrated product fulfillment configuration, the product fulfillment may be orchestrated by a same server that handles the sale of the product. In a separate product fulfillment configuration, the product fulfillment may be governed by a different server from the server used for the product sale. Optionally, a different company may handle delivery distinct from sale.

Certain embodiments permit a customer to place orders at a virtual storefront and then pick up merchandise at a locker or will-call facility or defer to shipment. For example, in the case of picking up the merchandise from a locker, the customer can ask for the product to be delivered to a locker facility. The locker facility can be owned by a third party or by the vendor selling the product. Similarly, the will-call facility can be owned by a third party or by the vendor selling the product. The location of the locker facility or will-call facility may be selected by the customer or may be automatically selected by the system based on, for example, a billing address of the customer. If the defer to shipment option is selected, the shipment may be made directly from a warehouse, factory, or other facility of the vendor or from a third party facility.

One alternative vending mechanism is for a gift card to be issued. For example, the kiosk itself could issue a physical gift card, or a virtual or electronic gift card could be delivered to a customer in accordance with a sale obtained via the kiosk. The gift card could be delivered by short message service (SMS), by e-mail, or by any other desired. Optionally, a physical gift card could be mailed to the customer. The gift card could be for a specific product or set of products, or for a specific amount of money.

Modules may be delivered and picked up with products pre-loaded, and as module inventory becomes depleted, a re-provisioning request can be sent to the vendor through the network connection. For example, a module may be a combination of goods from one or more manufacturers. The combination may be based on recent levels of demand or interest expressed by consumers at kiosks or via an online portal.

Certain embodiments can interface to an online retailer or a locker system for the online retailer. The interface may permit the system to query the online retailer or locker system and inquire whether a locker is available for delivery of the goods. The modules mentioned above may be provided in advance to the locker facility, to permit rapid stocking of a designated locker. In certain cases, popular items may be pre-stocked into lockers for instant availability to consumers.

Alternative fulfillment and dynamically reconfigurable fulfillment schemes can be based on inventory, product pricing, and revenue share agreements. As mentioned above, in some cases an alternative product can be offered instead of a customer-selected product, with a revenue sharing arrangement existing between the provider of the customer-selected product and the provider of the alternative product.

Drone delivery systems can be employed. These systems can provide for delivery of product via drone. The system can synchronize to a user's device for endpoint verification of the user's identity. The drones can be ground-based with an autonomous ground vehicle or airborne with an autonomous or human-controlled airborne vehicle. Another alternative is to have the delivery be based on a taxi system. The taxi may be controlled autonomously, by an android robot, or locally or remotely by a human being.

Certain embodiments relate to a multi-platform product merchandising and delivery system. The multi-platform system may be capable of providing merchandising across more than one platform. For example, the merchandising may be provided through a website or similar interface at a kiosk terminal, but also may be provided via a website accessible from a user's mobile device or a smart phone app.

Similarly, a portion of the merchandising effort can take place through an interactive exhibit in a shared commercial space, but delivery can be coordinated via the user's device, such as through a mobile app or a website.

Certain embodiments may involve a mobile device combined direct interactive space implementation. There are various ways that these may be combined. For example, users may be provided with access to a mobile device interface option via the interactive space. This access can be provided reactively by requesting a user to provide contact information, such as a phone number, a social media handle, or an email address. The system can then use the contact information to provide the user with access to the website or app, for example by providing a link in an email, or a link to an app.

Alternatively, the access can be provided proactively by displaying a URL, for example a shortened URL, on a screen. Other types of access can be provided proactively, for example by providing a computer-readable code for a mobile device to read, or by providing printed instructions.

Certain embodiments may involve users utilizing mobile devices in conjunction with the tangible space to receive an enhanced/augmented shopping experience. This augmentation can take several forms. For example, the shopping experience can be enhanced by the presentation of a more complete catalog, videos or other media of products or related services, or the like.

The augmentation can also take the form of providing a customer the opportunity to purchase the goods, and to select from among possible delivery options for the goods.

Certain embodiments allow mobile device users to install an application or app to be served augmented content. The app may be provided through a local download using a wireless interface, or the app may be provided through an app store. The augmented content can include a more complete catalog, videos or other media of products or related services, or the like. The augmented content can also include augmented reality features that can be imposed over the physical representation of the goods, for example to indicate other color options, available size options, a product description, or the like. The augmented content can include links to further information and to delivery options.

Certain embodiments can present a computer-readable code, such as a quick response (QR) code, for general links to a product to complete a purchase, or can present a dynamically generated computer-readable code for specific purchases that the user can scan.

Certain embodiments can allow a peer-to-peer pairing (for example using Bluetooth) to serve additional content to user devices. For example, a device at a kiosk can offer video or other media to user devices over a wireless link to the user devices. The wireless link may be a wireless local area network (WLAN) or similar link, or may be a simple device-to-device link that does not include any other connections.

Certain embodiments can allow sync with device via near field communication (NFC) scan.

Certain embodiments allow fulfillment without the counter. The consumer can do it privately. Disruption, android pay Apple pay, etc.; the order follows them to the counter and they pay with minimal hassle In certain embodiments, if an app was activated for a particular tangible vendor, it could present time-persistent ads reminding the customer to complete a purchase.

In certain embodiments, if an app was activated for a particular tangible vendor, it could present options for the customer, including possible coupons or discounts to encourage order completion/fulfillment.

In certain embodiments, if an app was activated for a particular tangible vendor, it could allow the user to continue the shopping experience beyond the Tangible space, say, for example, at the food court while getting lunch.

In certain embodiments, if an app was activated for a particular tangible vendor, it could recognize a user from a previous visit and serve content tailored to that user Certain embodiments can include both an app and a responsive website.

Certain embodiments can provide additional information from to a particular vendor by a prompted/confirmed response to a "push" prompt request when in proximity to the kiosk space.

Certain embodiments relate to a redeployable product merchandising system. This may be a kiosk-implemented system in which the kiosk can be built up and torn down in a reusable way. Thus, for example, the kiosk system may not requiring the pouring of concrete or installing drywall onto studs.

Certain embodiments include a mobile space that can be moved to where people gather. For example, the mobile space can be moved to concerts, fairs, other venues where foot traffic opportunities exist. The mobile space may be suitable for use in a convention hall or the like.

Certain embodiments may be transportable on a truck. For example, certain embodiments can be set up like a cargo container that can be easily trucked and either configured in place with entrance ramps. Certain embodiments may be deployed on the ground or other location. The truck can then leave the mobile storefront in place to operate. Thus, for example, certain embodiments may be implemented similar to a booth or kiosk of a travelling carnival.

Certain embodiments may include a wireless link to a central server to allow content to be interactively updated, vendors to monitor on-site inventory, or the like. For example, the wireless link may be through a data backhaul through mobile service providers, such as cellular or satellite radio access networks.

Certain embodiments may be provided for demonstration to customers, similar to a fixed environment, but in a mobile environment. For example, the layout of shelves, drawers, racks, or other display structures may be similar between mobile environments and fixed environments.

Certain embodiments can be configured to present relevant product to the consumer base. For example, certain embodiments may be loaded with, for example, tee shirts or other merchandise oriented to a team, event, band, concert, or show that is currently performing nearby.

Certain embodiments can complete a transaction on-site. The transaction can be complete through a locker/code on a receipt or through a mobile device. The following are some illustrative examples.

According to a first example, the system can send a buyer a QR code, the buyer can walk to a fulfillment area, the buyer can display the QR, the system in the fulfillment area can scan the code, and the product can be delivered or a locker can be opened to allow the buyer to retrieve the product.

According to a second example, a buyer can install an app. The buyer can then do shopping using the app in combination with the displays in the mobile display unit. The device of the buyer can send through, for example, Bluetooth or infrared, an encrypted command to deliver the product or open a locker at fulfillment center.

Certain embodiments may be implemented on a skid, pallet arrangement, or the like. The system can implement modular vendor stations that could be inter-changeably linked or individually deployed. One or more module could be even dropped and rolled into a retail store for product samples/sales and removed when the promotion is terminated.

Certain embodiments can permit an app on a user's device to take a picture of a product on a shelf, recognize the object based on the image, and direct the user as to how to purchase the product from their device.

Certain embodiments may monitor how long a user is holding a product. Moreover, certain embodiments may determine whether a user eventually ends up purchasing the product after holding the product. This process of holding and subsequently purchasing can be viewed as a conversion rate. The system can monitor hold time as it relates to conversion rate. One or more sensors of the system can determine the hold time.

Certain embodiments can also include sensors designed to track eye movements of visitors to the kiosk. The eye tracking can be used to help identify the best layout and/or the best areas of a layout. Certain embodiments may determine the best area of the kiosk for a particular brand.

Certain embodiments can further include tracking customers as they move through the structure. Sensors can be used to track customer movement to see what areas typically lead to longer dwell times, more purchases, and more movement to additional areas of the structure. Sensors can be used to track customer movement around the structure. Sensors can be used to determine the effect of dynamic signage on the customers that are moving around the structure.

Certain embodiments may employ or embody an augmented reality system. For example, an app can be supplied to a smartphone, or other device, of a customer. The app may permit the customer to point the device at the product and the app may augment the view of the product with additional product specifications, additional versions of the product, or the like. Additionally, the app may provide for featured products that may not be available in the kiosk.

In certain embodiments, an app may cross-sell other products to the customer, based on the products being currently viewed or handled by the customer.

Certain embodiments may employ virtual reality to permit a customer to experience the products through synthesized feeling, such as through virtual reality gloves or other haptic devices. Certain embodiments may permit the customer to digitally order the product and have it delivered from within the same app. Thus, in certain embodiments, the customer may be able to shop while dining at a restaurant or bar. Alternatively, in certain embodiments, the virtual reality experience may permit an enhanced in-store or in-kiosk experience.

Certain embodiments may provide a customer with a code that can be used when the customer is picking up the product in a store, receiving the product at a curbside pickup location, accepting delivery of the product, or picking up the product from a locker or the like.

Certain embodiments may provide for a virtual dressing room. Thus, for example, certain embodiments may permit a customer to take an image of themselves and virtually dress it up with an image of a product. The image may be a still image or a video image. The product may be one of the products that is on display in the kiosk, or may be another product, such as a previously displayed product or a product from another aspect of the shopping line of one of the vendors whose products are now or formerly were displayed in the kiosk.

Certain embodiments may also use hologram technology to display upcoming products. This may permit customers to experience the products in three dimensions, even before the product is available. This technique may also be used on products that are too delicate or too expensive to be handled. This technique may also be used to provide scaled versions of products that are too large or too small to be handled.

Certain embodiments may evaluate a customer selection, either within the kiosk or in an app or website, and may attempt to upsell or provide an alternative connection with related brands within or outside of the kiosk.

Certain embodiments may use sensors to identify the demographics of each shopper or the demographics of a group of shoppers. The system may use this demographic for suggestive selling to the individual customer or group.

Certain embodiments may connect with a food court tenant for taste tests. The food court tenant may have a display structure, such as a shelf on which the food may be displayed for a taste test.

Certain embodiments may a digital or robotic assistant. The assistant may provide a curated experience. The assistant may be a physical assistant in the kiosk. The system can also include a virtual assistant in an app or website.

Certain embodiments may provide for video chats between the customers and brand owners. These video chats can be provided via fixed terminals within the kiosk or via an app or website.

Certain embodiments may use digital branding signs, printed branding signs, or a combination thereof. As mentioned above, the digital signs may be dynamically reconfigurable, based on time of day or for other reasons.

Certain embodiments may maintain a customer history. The customer history may be determined based on image recognition, such as fascial recognition. Alternatively, the customer history may be based on app usage, website usage, credit card usage, or any other data input stream. The system may recognize shoppers as they return and may try to sell products that the customers previously viewed and/or complimentary products.

Certain embodiments may provide for specific mechanisms for allowing the user to locate a particular item within the kiosk. For example, in certain embodiment lights, illuminated tiles on the floor, or laser art projected on the floor may permit the system to direct the customer as to where to go. Other surfaces of the kiosk may also be used, such as wall surfaces.

Certain embodiments may permit quick checkout via electronic credentials, such as an electronic wallet or other commercial banking system.

Certain embodiments may employ a physically dynamic display arrangement. For example, certain embodiments may have a carousel, conveyer belt, or other physically dynamic feature to show more multiple tenants' products, for example, more than eight tenants' products. The carousel, conveyor belt, or other mechanism may be used to rotate the display of products to different locations within the kiosk or from a storage area to a display area.

Certain embodiments may track a user's search history on the user's device and may suggest similar/complimentary products.

Certain embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A system, comprising:
   a communication gateway within a shared commercial region, the gateway communicatively coupled to a local network and at least one host server, the host server providing an interface for presenting information relating to one or more tenant vendors of the shared commercial region;
   a plurality of interaction terminals communicatively coupled to the communication gateway through the local network, each of the plurality of terminals configured to allow interaction with one or more websites hosted by at least one of the tenant vendors of the shared commercial region, wherein:
     at least one electronic display of the plurality of interaction terminals is remotely reconfigurable by at least one of the tenant vendors via a web server,
     at least one layout of the at least one electronic display is controlled by at least one remote host server in communication with the web server, and
     the plurality of interaction terminals are configured to interface with a website operated by an entity distinct from the one or more tenant vendors and configured to re-route to at least one website operated by the one or more tenant vendors; said system further comprising
   a common area of the shared commercial region, wherein:
     the common area is configured to permit pedestrian travel among the plurality of interaction terminals; and
     the common area is configured to present one or more physical representations of goods offered by a vendor tenant, the one or more physical representations located within the shared commercial space;
   wherein each of the interaction terminals is configured to:
     present product information from a selected tenant vendor; and
     invite a customer to interact with the one or more physical representations of goods corresponding to the selected tenant vendor's product information,
   wherein the system comprises a redeployable system that is configured to be disassembled at an original location and reassembled at a new location.

2. The system of claim 1, wherein the interaction terminals further comprise:
   a user interface comprising a display, a speaker, and user input device, the user input device comprising one or more of a touch screen, a mouse, a camera, a touch tablet, one or more buttons, a microphone, and NFC component, an RFID component, and a keyboard; and a processor coupled to the user interface, a device communication interface coupled to the local network, and a memory.

3. The system of claim 2, wherein the memory is configured to store instructions that when executed by the processor, perform the functions of:

receiving, through the device communication interface, product information provided by one or more of the tenant vendors;

displaying, through the user interface, the product information corresponding to goods offered by the selected tenant vendor; and prompting the customer to select a product offered by the selected tenant vendor.

4. The system of claim 3, wherein the memory is configured to store instructions that when executed by the processor, perform the functions of:

determining, from an indicia provided by the host server, that a physical representation of the goods offered by the selected tenant vendor are available for inspection by the customer in the shared commercial region; and providing instructions regarding location of the goods offered by the selected tenant vendor in the shared commercial region.

5. The system of claim 2, wherein the memory is configured to store instructions that when executed by the processor, perform the functions of:

prompting the customer to enter a product identifier corresponding to goods located within the shared commercial space; and displaying, through the user interface, product information corresponding to goods offered by the selected tenant vendor.

6. The system of claim 1, wherein the communications gateway comprises one or more of a router or a switch communicatively connected to an external network and the local network.

7. The system of claim 6, wherein:

one or more tenant vendor servers are communicatively coupled to the communications gateway through the external network; and the product information corresponding to goods offered by the selected tenant vendor are provided to the interaction terminals though the communications gateway.

8. The system of claim 1, wherein an interior space of the shared commercial region comprises a display fixture configured to display one or more goods corresponding to a tenant vendor.

9. The system of claim 8, wherein the display fixture is configured to exhibit goods through one or more of:

a shelf unit;

a movable rack;

a locking cabinet with transparent door;

a deployable shelf configured to be lowered from a ceiling of the shared commercial region;

a deployable shelf configured to be raised from a floor of the shared commercial region;

a deployable drawer configured to slide from an enclosed cabinet;

a motor-driven rotatable column display; and combinations thereof.

10. The system of claim 8, wherein a visual indicia is provided in proximity to goods displayed on the display fixture, the indicia comprising one of:

a descriptive text label, identifying a name of the goods and a product number corresponding to a product number for the associated tenant vendor;

a scannable RFID tag containing a unique identifier for the displayed goods;

an NFC tag containing a unique identifier for the displayed goods;

a QR code encoded with a website link corresponding to a product information page for the goods provided by the associated tenant vendor;

a controllable lighting element coupled to a lighting controller, the lighting controller coupled to the local network, wherein the lighting element is illuminated by the lighting controller when a corresponding product information page is selected on an interaction terminal by a customer; and a button coupled to the local network, wherein upon a customer actuating the button a corresponding product information page is displayed on one of the interaction terminals.

11. The system of claim 8, wherein the visual indicia includes a colored highlight being displayed on the display terminal in proximity to the product being displayed and a colored light being illuminated in proximity to the goods on display.

12. The system of claim 1, wherein the host server further comprises a processor, a memory communicatively coupled to the processor, a database communicatively coupled to the processor, and a communication interface coupled to the processor and to the communication gateway of the shared commercial region through an external network; and wherein:

the database of the host server is configured to store:

an inventory of goods corresponding to a selected tenant vendor;

a location where the goods may be found within a particular shared commercial region; and a linking identifier uniquely associating the goods with respective product information from the respective corresponding tenant vendors.

13. The system of claim 12, further comprising a second shared commercial region, communicatively coupled to the host server through a second communications gateway, and wherein:

the host server maintains, in host server database, a geographically-oriented list of goods available by the tenant vendors in a particular shared commercial region; and upon being queried about availability of goods, provides an indicia of where such goods may be available for inspection by a customer.

14. The system of claim 1, further comprising:

accepting input by a customer through one of the interaction terminals comprising a request to purchase the goods; and directing the customer to a tenant vendor's website order processing webpage hosted by a tenant vendor server coupled to the shared commercial region through an external network; whereupon the customer may complete a transaction to purchase the goods through the tenant vendor's website.

15. The system of claim 1, further comprising:

accepting input by a customer through one of the interaction terminals comprising a request to purchase the goods;

prompting the customer to enter one of an email address or a phone number corresponding to the customer's mobile device; and sending a deferred purchase link to one of the customer's email address or mobile phone.

16. The system of claim 1, further comprising one or more sensors comprising at least one of a digital camera and a microphone.

17. The system of claim 1, wherein the shared commercial region is located in one of:

a store area of a retail venue or shopping center;

within a large retail store; and within a portable and deployable vehicle.

\* \* \* \* \*